July 6, 1943.　　P. PARKE ET AL　　2,323,620
COACH-SLEEPER VEHICLE
Filed July 31, 1940　　17 Sheets-Sheet 1
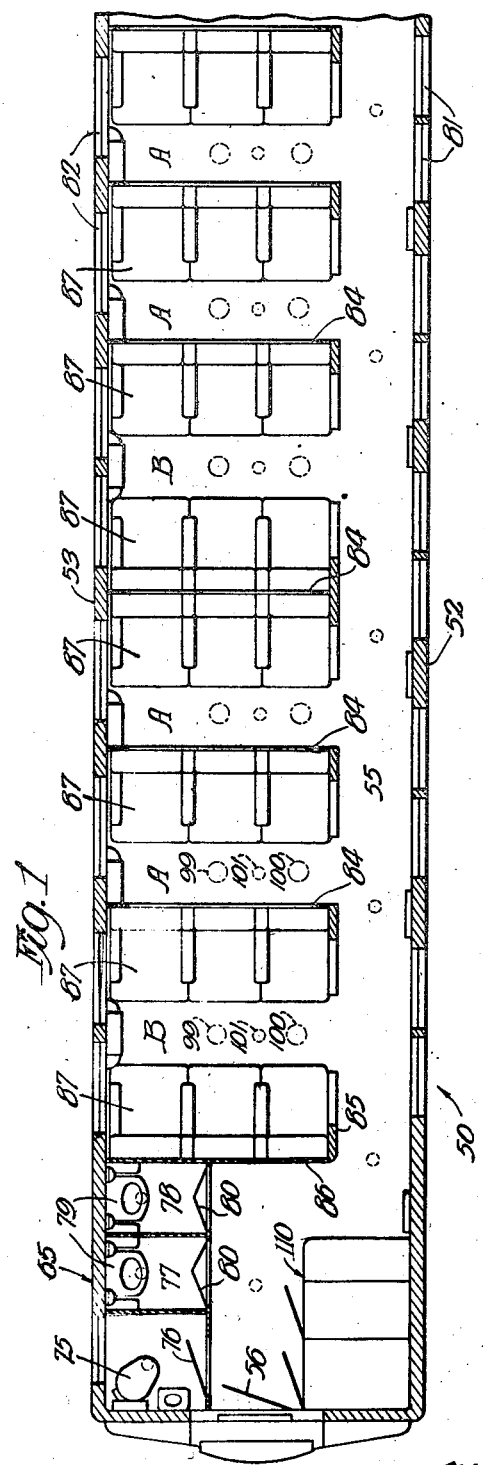
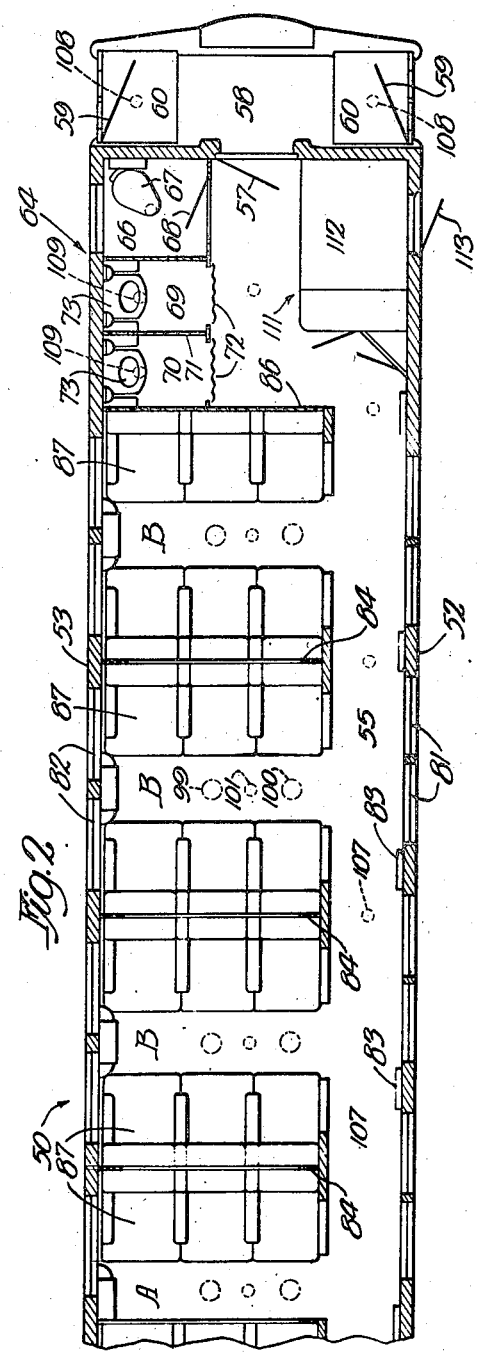
INVENTORS
PETER PARKE
JAMES K. TULLY
BY　LEIF ANDERSEN
BASIL E. JONES
ATTORNEYS

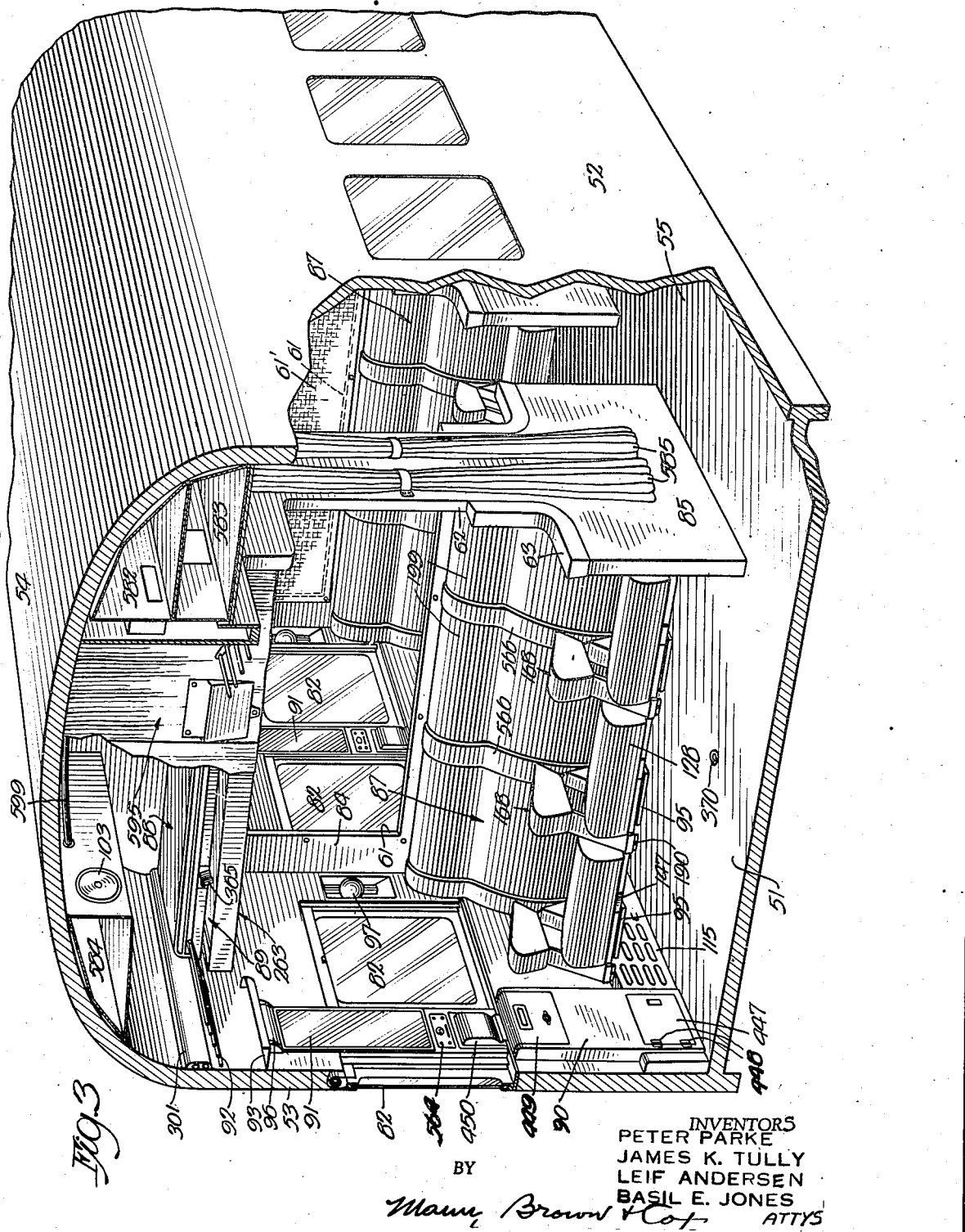

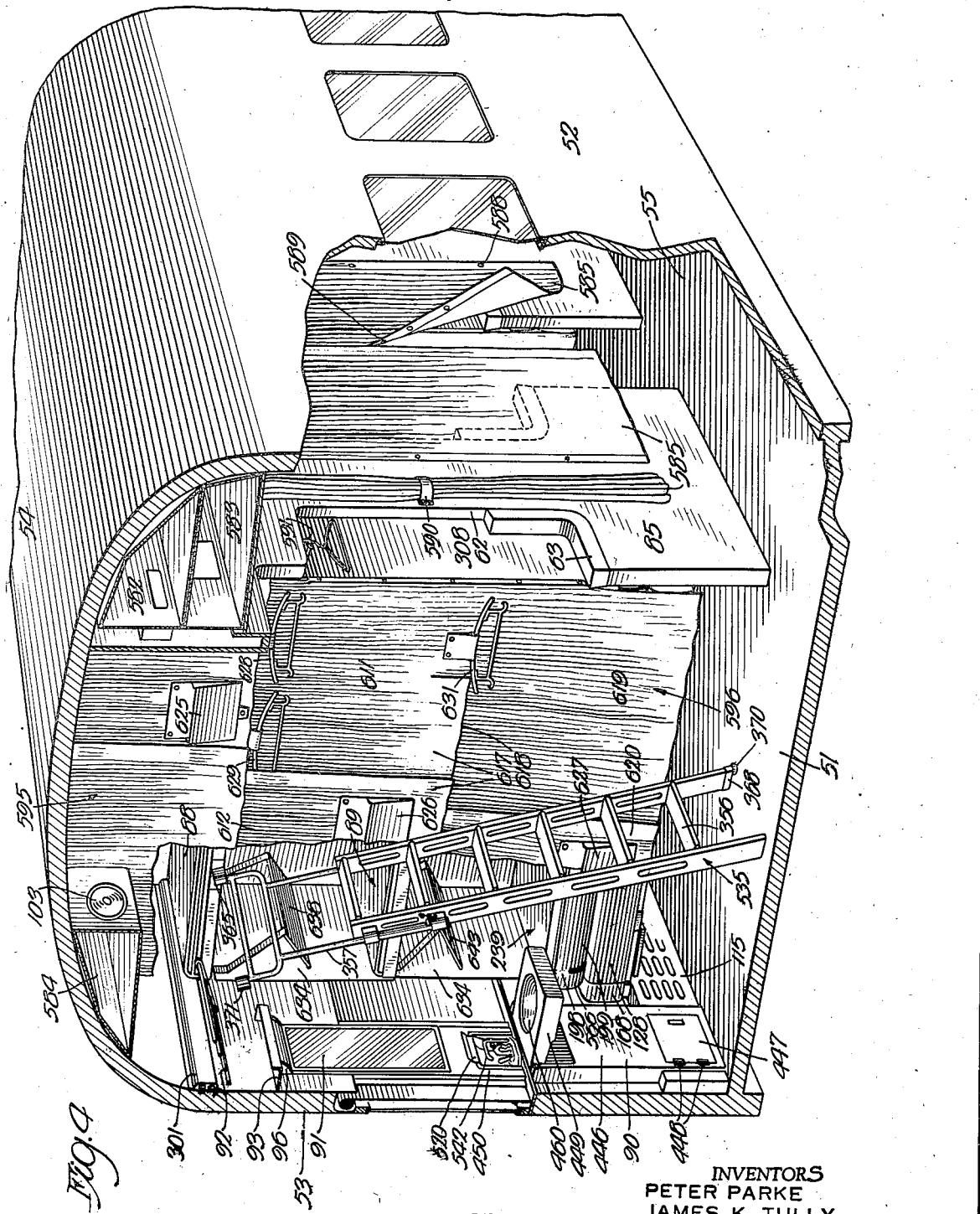

July 6, 1943.   P. PARKE ET AL   2,323,620
COACH-SLEEPER VEHICLE
Filed July 31, 1940   17 Sheets-Sheet 4
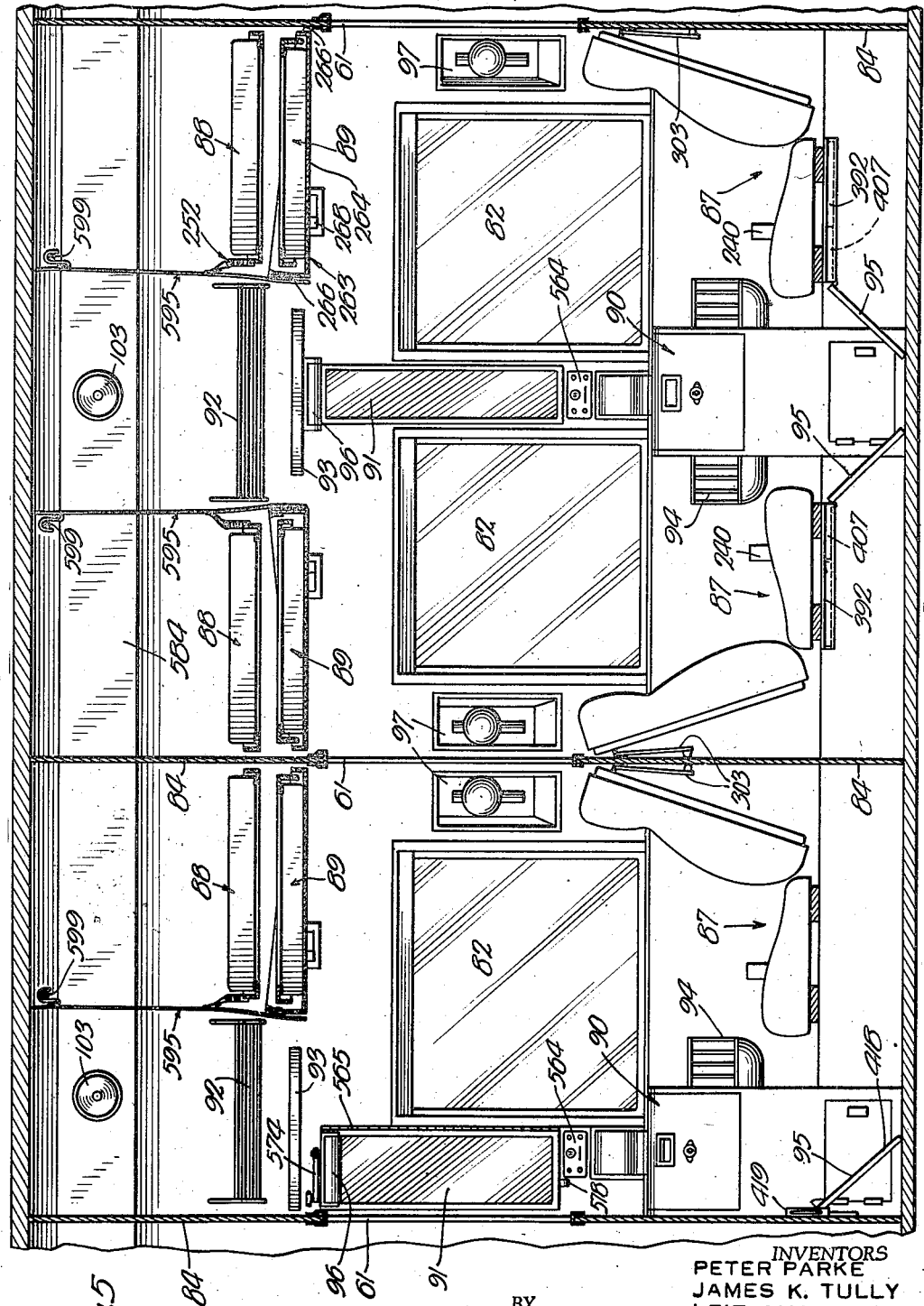
INVENTORS
PETER PARKE
JAMES K. TULLY
LEIF ANDERSEN
BASIL E. JONES
BY Mann, Brown &c ATTORNEYS

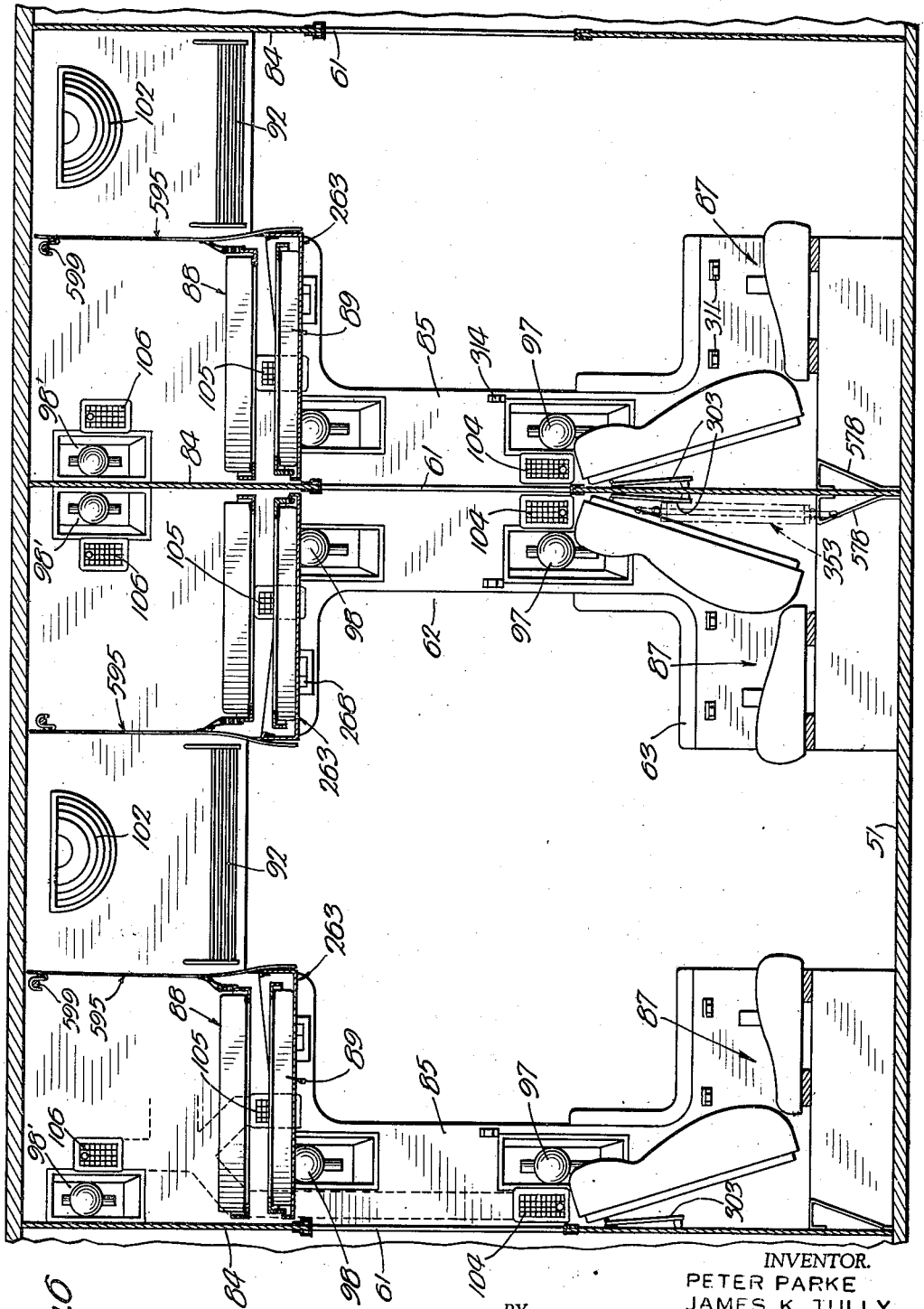

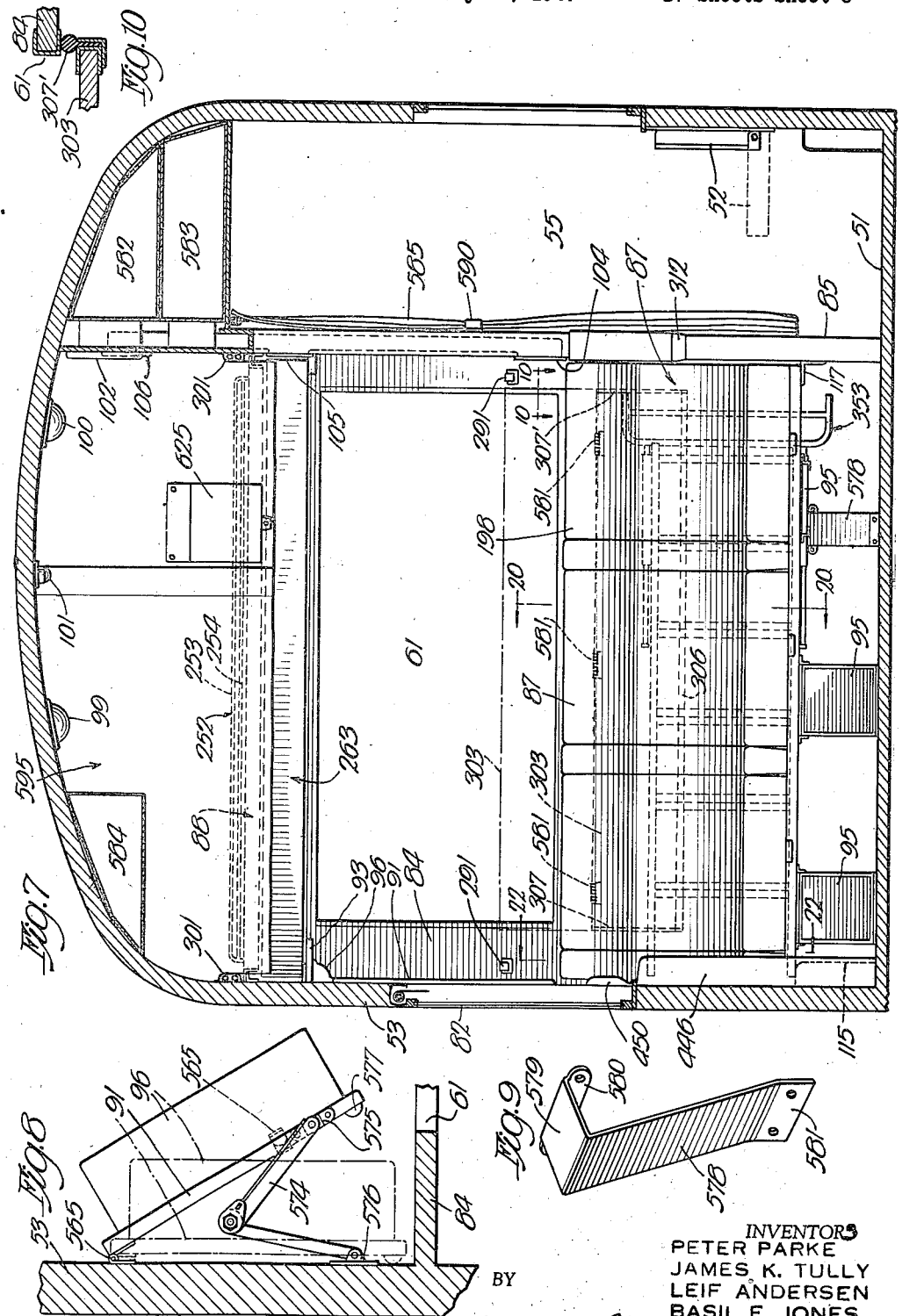

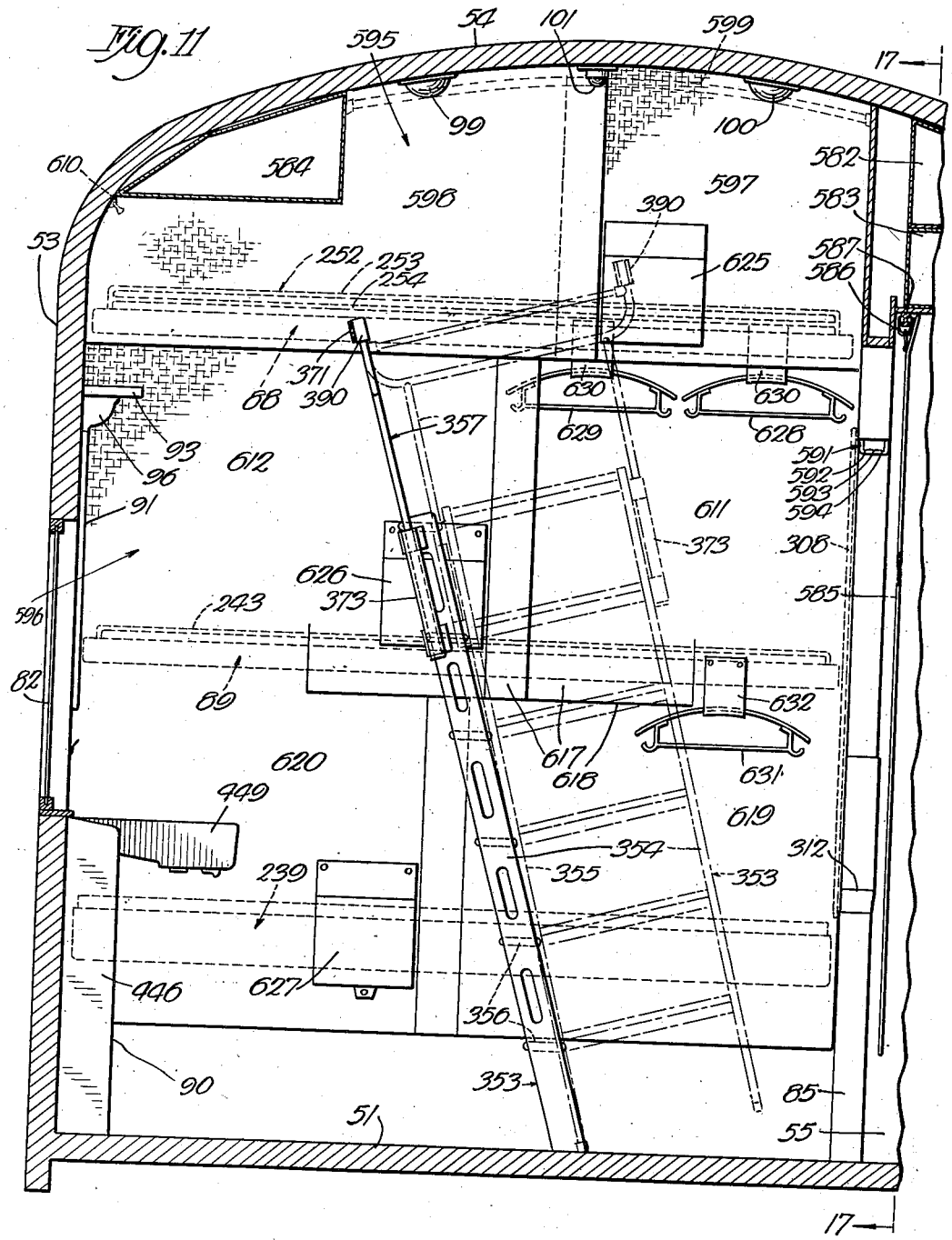

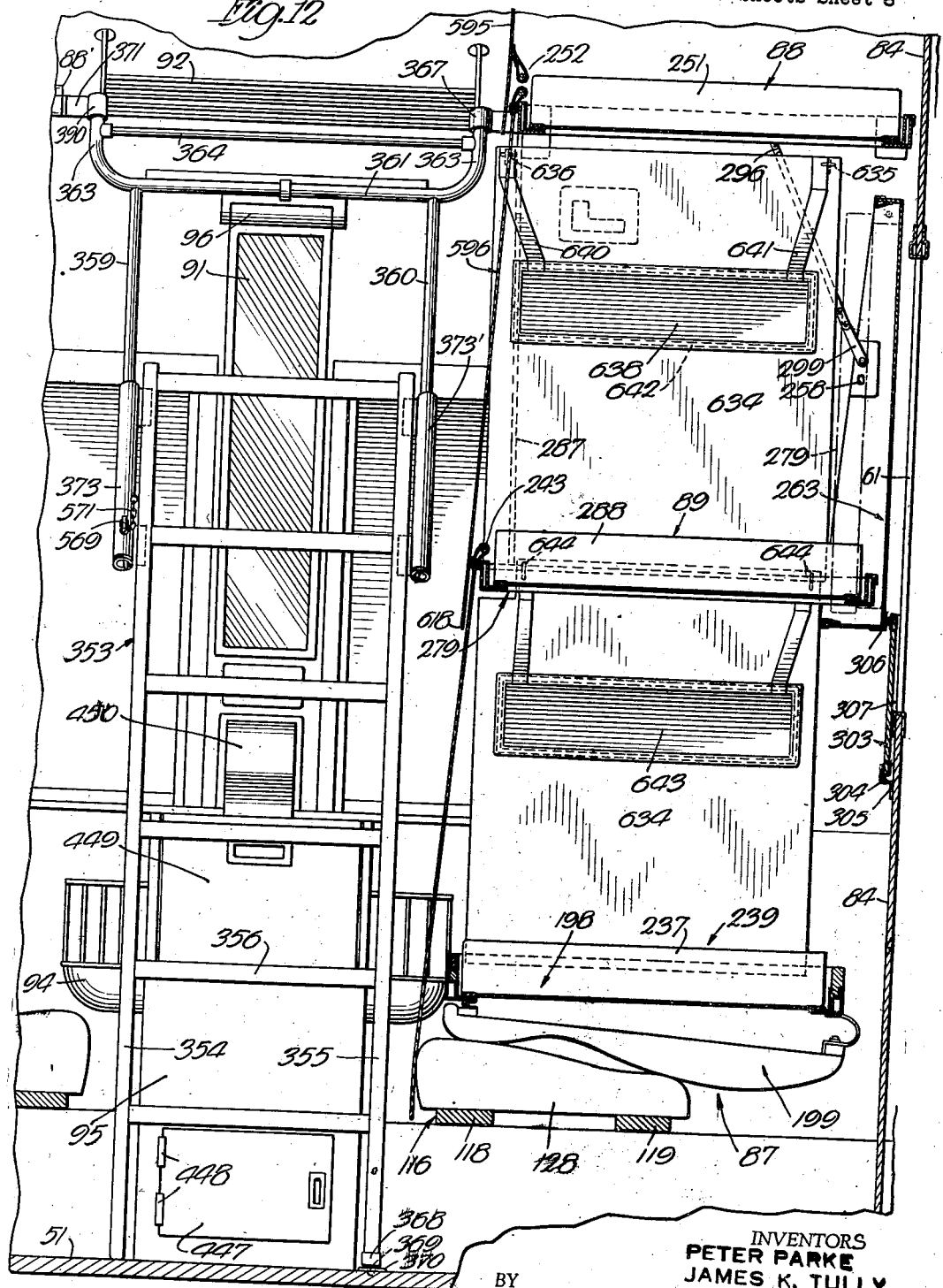

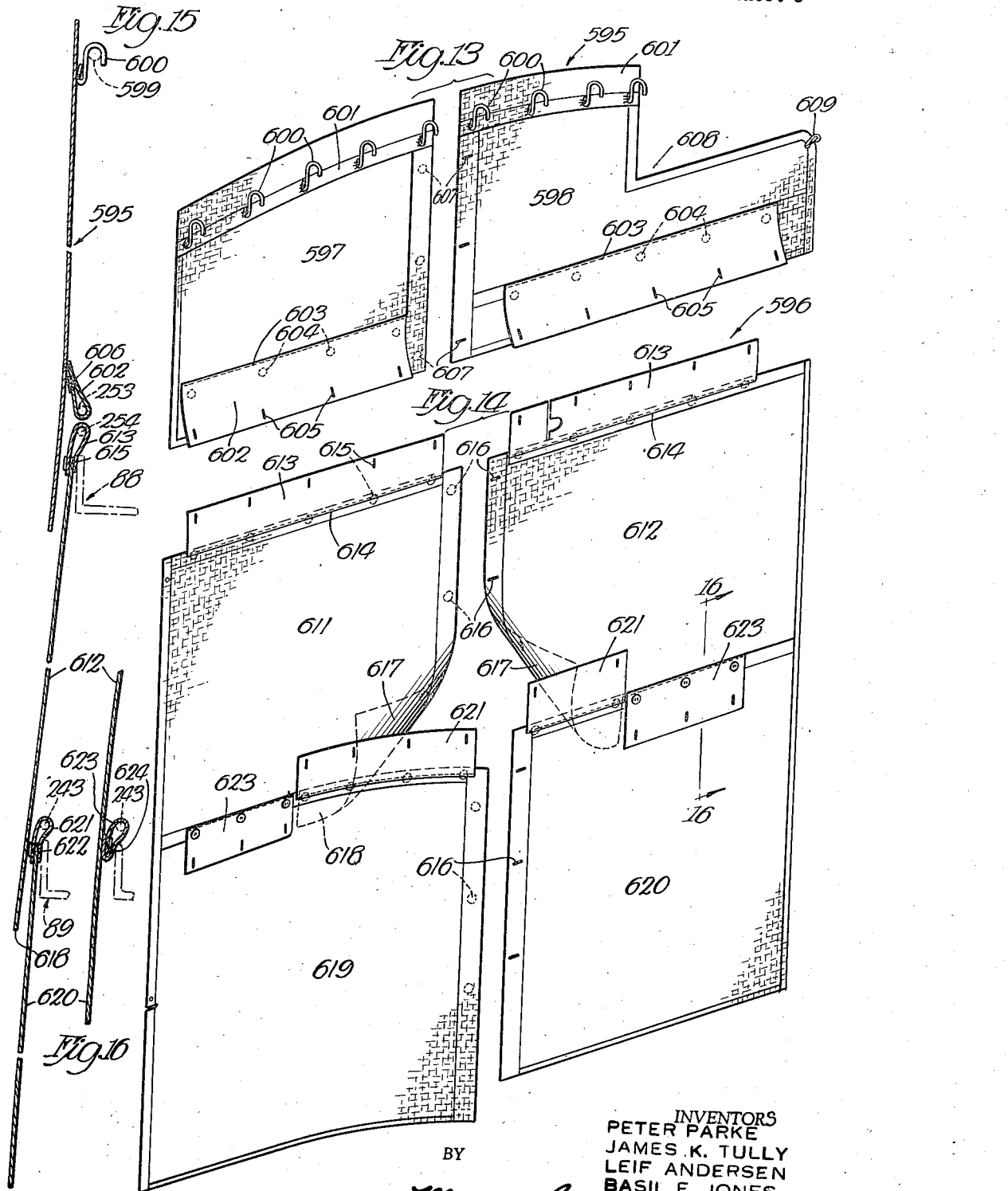

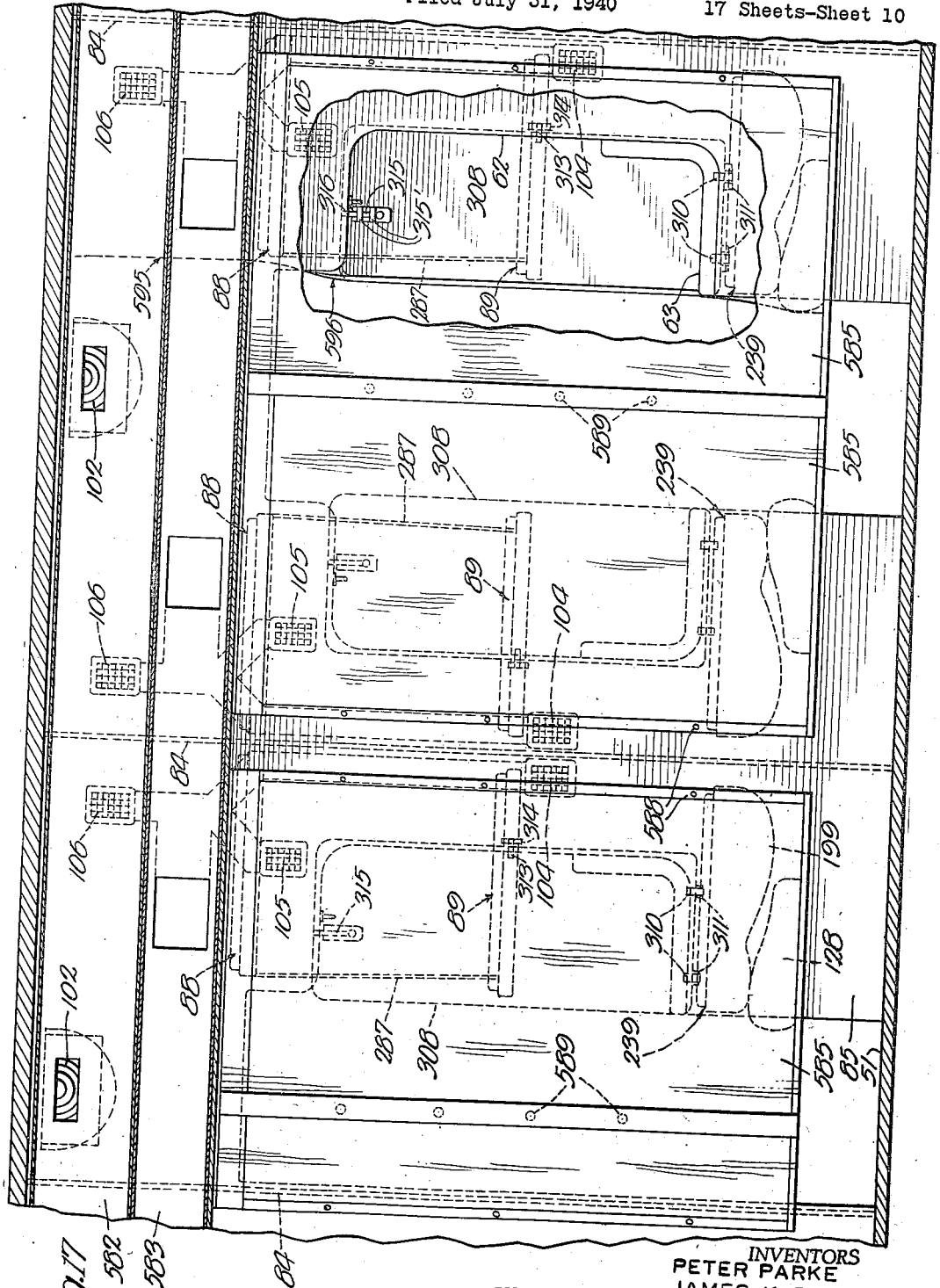

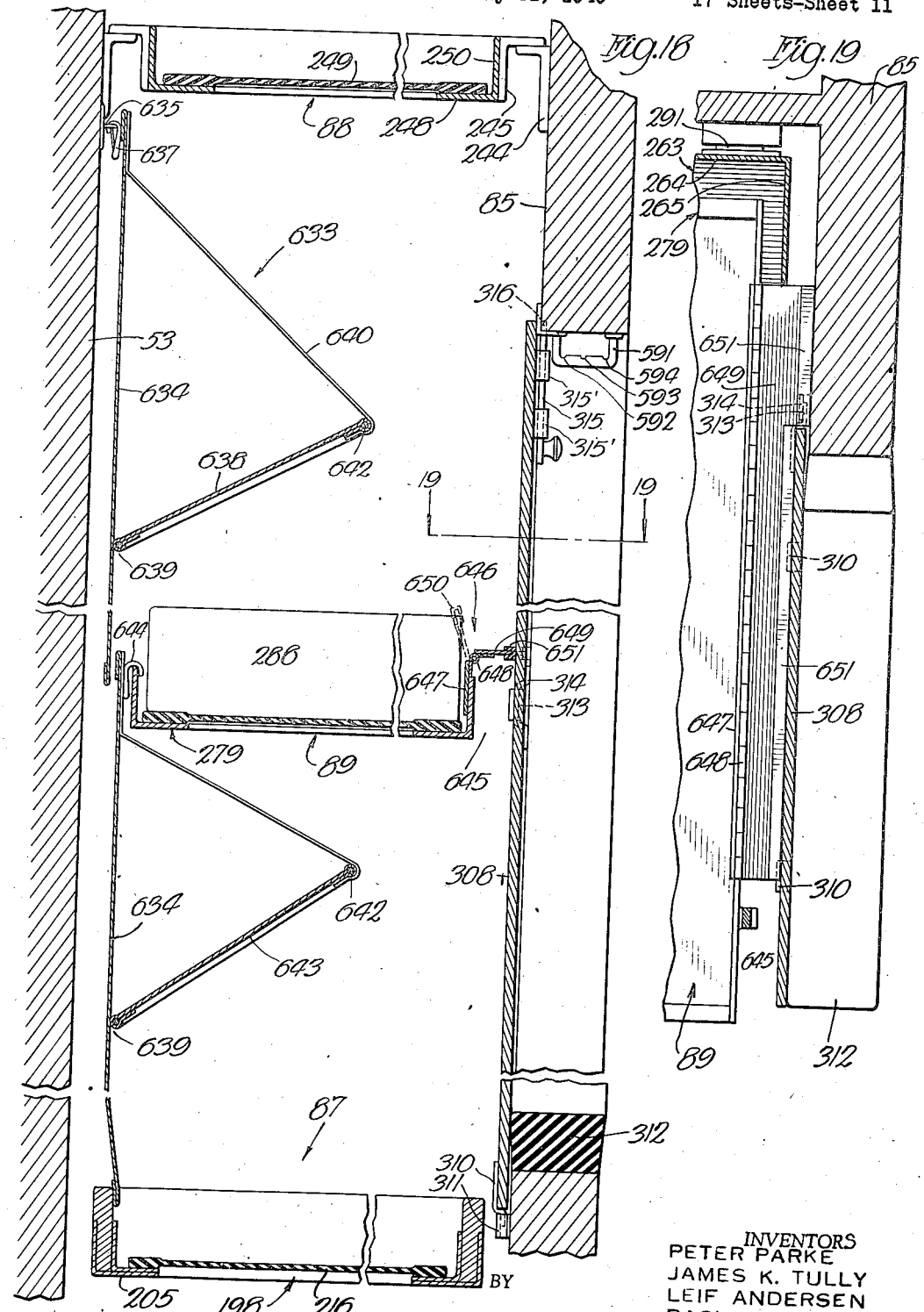

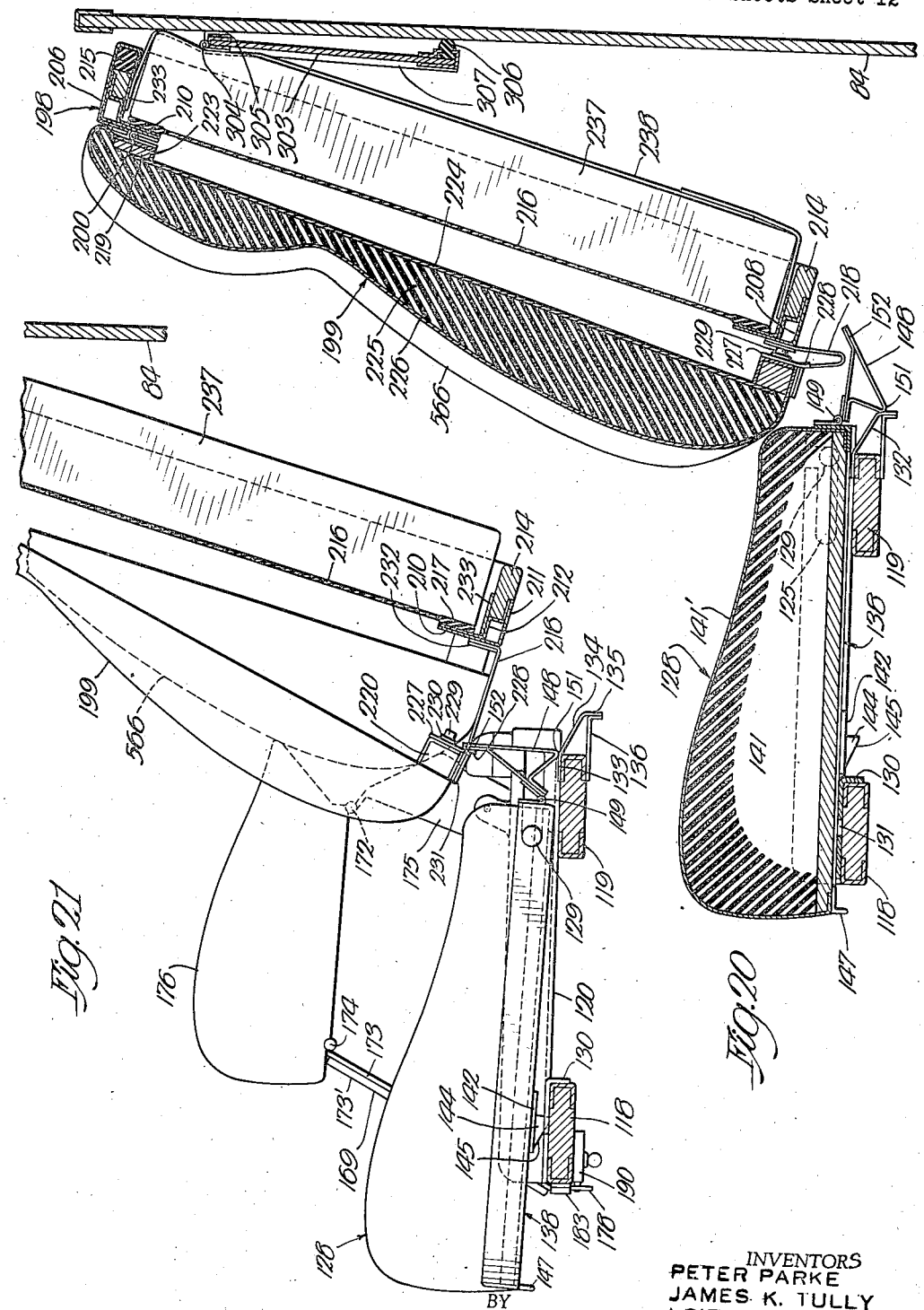

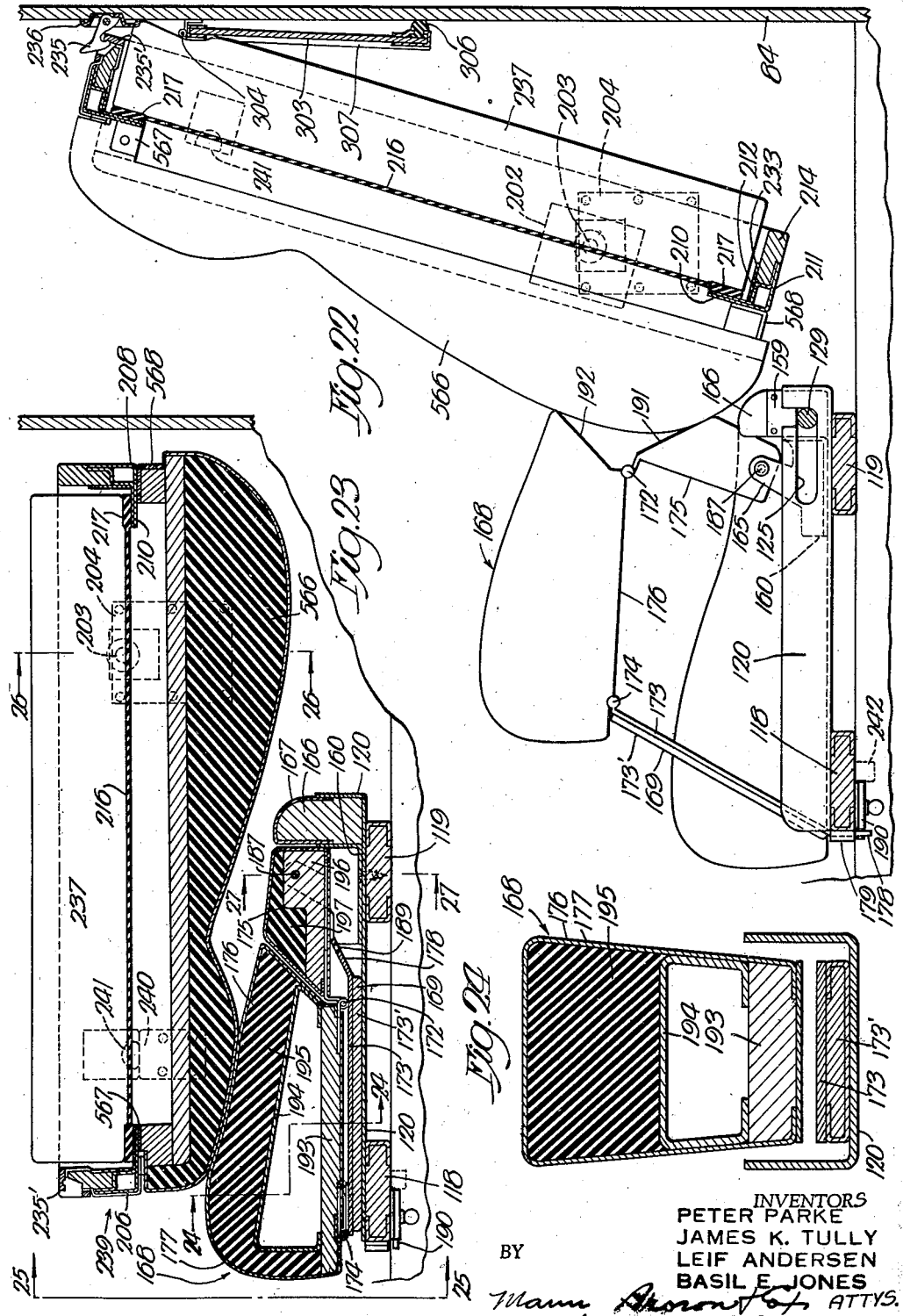

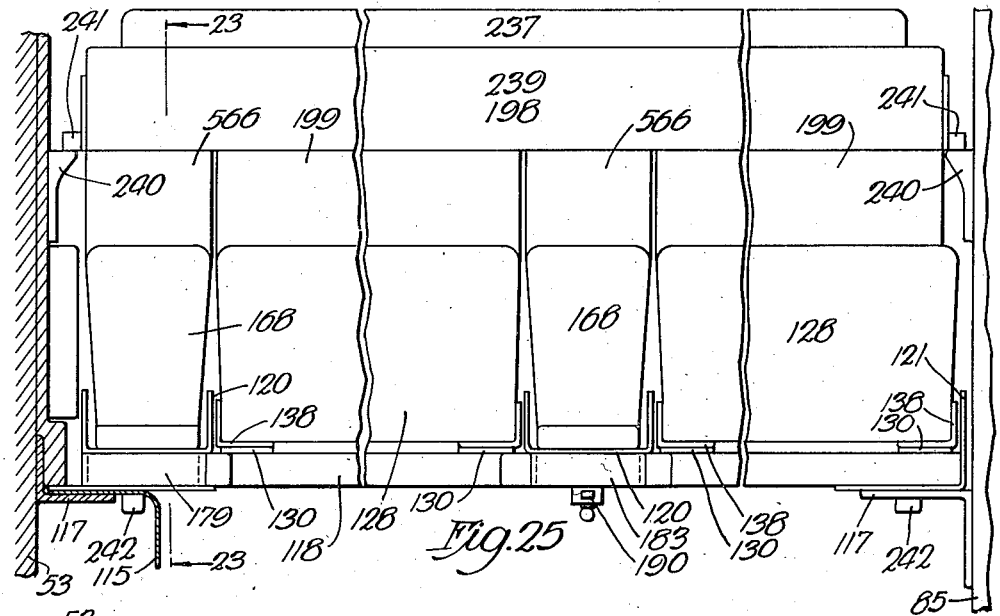
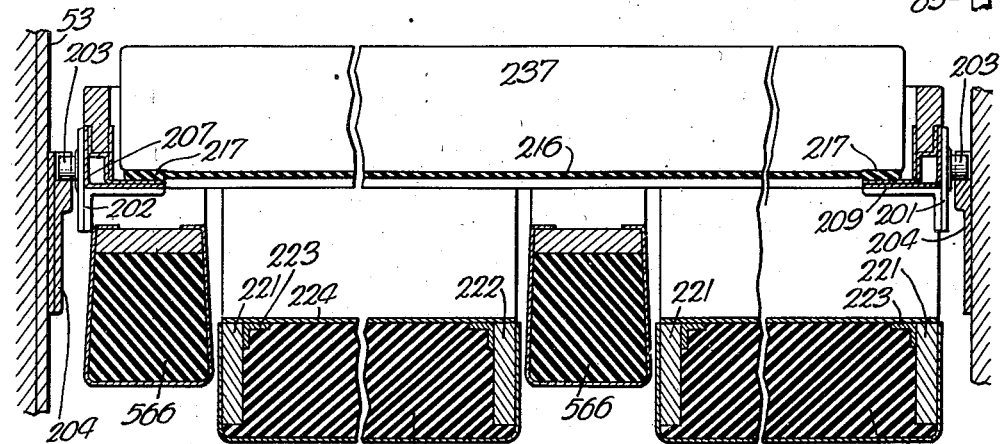
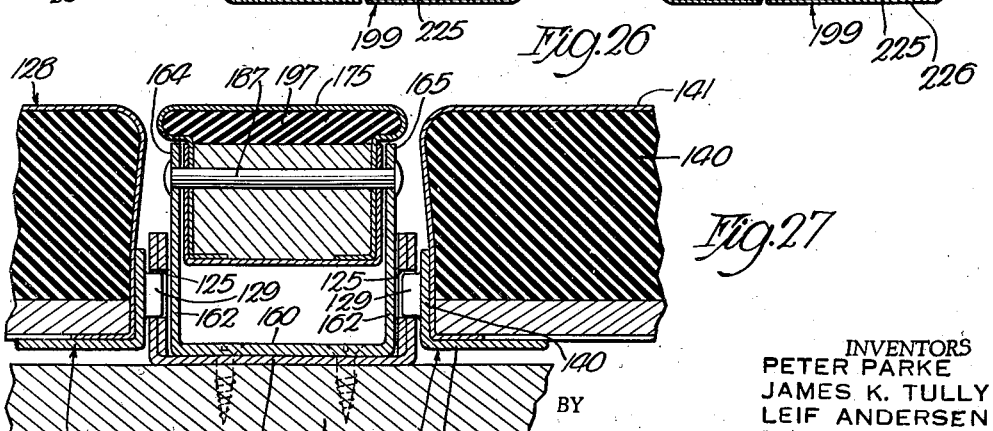

July 6, 1943.     P. PARKE ET AL     2,323,620
COACH-SLEEPER VEHICLE
Filed July 31, 1940     17 Sheets-Sheet 15

INVENTORS
PETER PARKE
JAMES K. TULLY
LEIF ANDERSEN
BASIL E. JONES
BY Mann, Brown & Co. ATTYS.

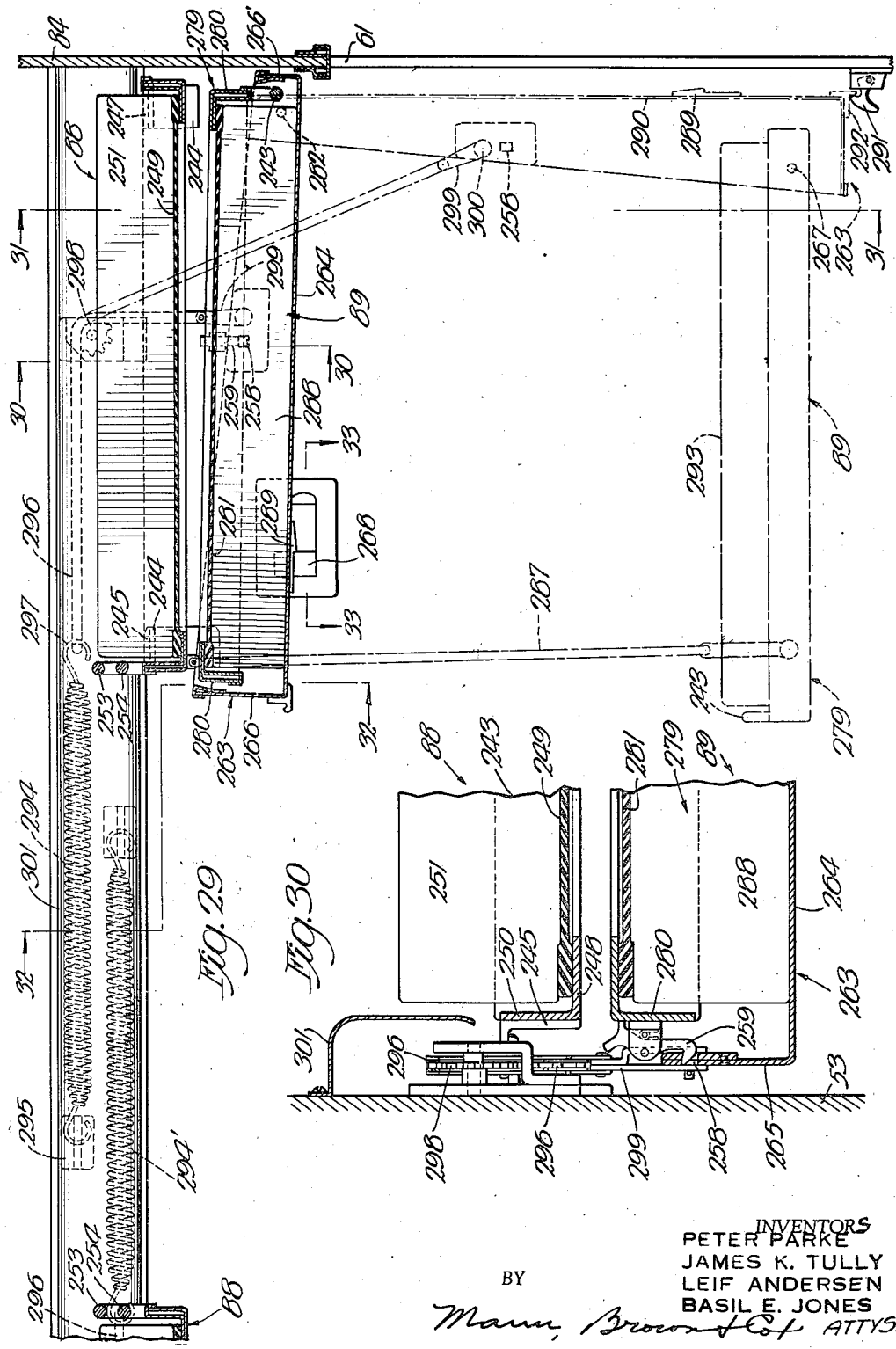

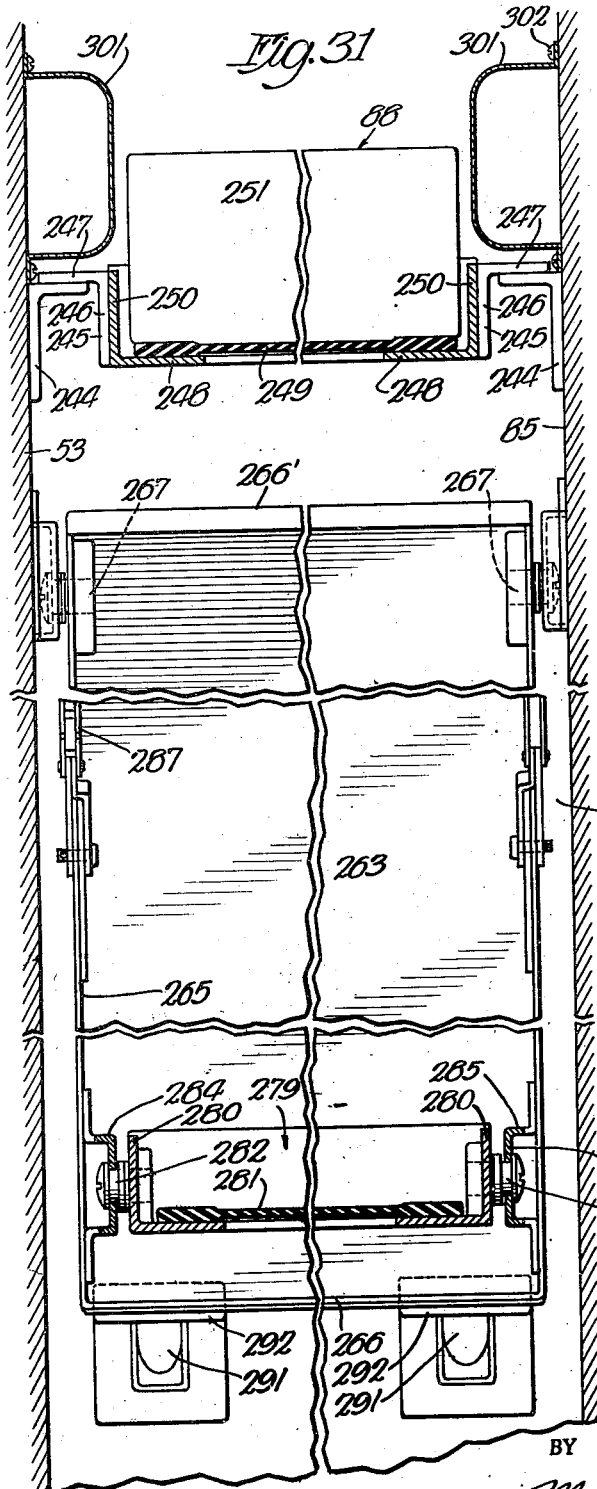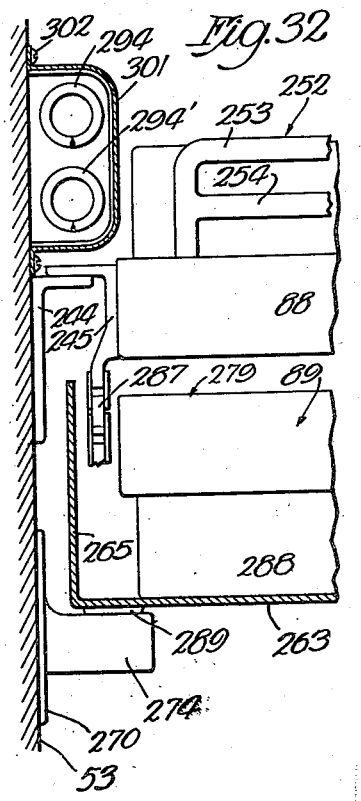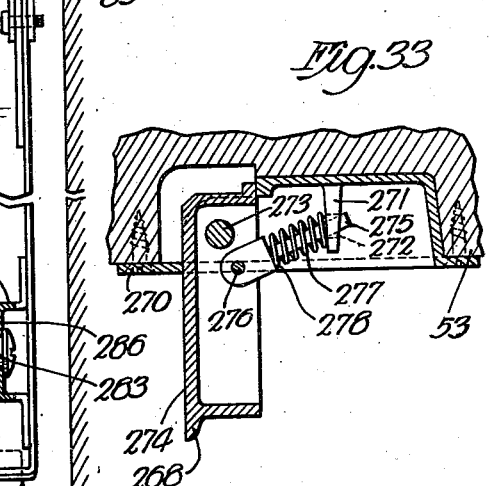

Patented July 6, 1943

2,323,620

UNITED STATES PATENT OFFICE 2,323,620

COACH-SLEEPER VEHICLE

Peter Parke, Chicago, James K. Tully, Evanston, Leif Andersen, Chicago, and Basil E. Jones, Flossmore, Ill., assignors to The Pullman Company, Chicago, Ill., a corporation of Illinois Application July 31, 1940, Serial No. 348,670

10 Claims. (Cl. 105—315)

There are numerous types of accommodations available to the railroad traveler today, and, depending upon the price he pays when purchasing his ticket, he may enjoy comforts ranging from a seat in the day coach, where he is required to sit in an upright position during the entire trip, to a comfortable bed in a Pullman sleeper with all of the conveniences of a well furnished home. There is a very clear line of demarcation drawn between coach and Pullman classes of travel, and at the present time a railroad ticket purchased for use in a day coach may not be acceptable in a Pullman car, since only a first-class ticket will be honored in the latter. There is a substantial difference in cost between coach and first-class railroad tickets; and, in addition to paying this additional cost, a Pullman traveler must pay a Pullman fare, the amount of this fare, of course, depending upon the type of Pullman accommodation purchased and the distance the occupant is traveling.

This division of fares is made necessary because of the differences in the number of passengers accommodated in the various types of cars. Fundamentally, a car must earn for the railroad a certain sum per trip in order for the railroad to meet the overhead charged to that car and to realize a reasonable profit. This base sum is figured on the car completely filled with paid passengers; and, of course, the proportion of the sum which each passenger will pay depends upon the number of persons which can be carried in the car. A standard day coach can accommodate from forty-five to about sixty-eight passengers, depending upon the particular floor plan arrangement of the car. The standard Pullman twelve-section car, having a drawing room at one end, can accommodate twenty-seven passengers. It can readily be seen from these figures that the railroad can afford to sell a ticket to a coach passenger at a lower price than it can to a standard Pullman passenger and still realize the base earning power figured on the basis of the car filled to capacity.

Heretofore, if a railroad traveler couldn't afford or didn't care to pay for a first-class railroad ticket and the additional fare required to ride in a Pullman sleeper, he was obliged to ride in a day coach, which meant that during the nighttime he was not provided with a bed, but had to sit upright, or at best in a semi-reclining position. The comforts afforded each day-coach occupant are necessarily limited, and no attempt whatever is made to furnish him with any degree of privacy during the nighttime when he is attempting to sleep.

As one of the principal objects of the present invention, it is intended to provide more comfort to the traveler than is afforded in the standard day coach, both in daytime travel and at night, and to give him a berth with many of the conveniences of the present day Pullman sleeping cars, but at the same time to increase the number of passengers which can be accommodated over and above the number which now can be taken care of in a standard sleeping car. Under these conditions, the cost to the traveler will not be much greater than that now required to ride in a standard day coach.

Many people prefer the feeling of privacy which they have in bedrooms, compartments, rooms, and other Pullman accommodations, while others prefer the open type cars, where they have a view of the full length of the car. Both of these conditions are present in the accommodations forming the subject matter of the present invention.

If a group of individuals wishes to have a game of cards or for some other reason desires room privacy during the daytime, it is available.

At nighttime, each section is converted into a room affording privacy to the occupants, and they may dress and undress while standing on the floor as distinguished from the limitations existing in the ordinary open section type of sleeper, where the occupant must prepare for bed while sitting or lying in his berth. Ample provisions are made during the nighttime to accommodate the occupant's clothes, and practically all of the comforts exeprienced by the first-class sleeper traveler are made available to the occupants of these new accommodations.

Each room is provided with at least one adjustable sofa which when made up for daytime use has three comfortable seats individually adjustable independently of the adjoining seats, so that each occupant may arrange his seat to satisfy his own requirements.

Unique collapsible arm rests are furnished, which give the maximum comfort to the daytime traveler.

Inasmuch as a car of this type can accommodate considerably more passengers than a standard Pullman sleeper, and since it is intended that one porter serve this car, as in the case of a standard Pullman sleeper, his tasks are necessarily greater than they are in the standard sleeper. This condition requires the berth arrangements to be greatly simplified, so that when the porter is called upon to prepare the accommodations for night use, he is able to complete his task as quickly, if not more promptly, than can be done in the standard sleeper.

The berths disclosed herein are arranged in tiers of three. The intermediate berth can be moved entirely out of the way during the daytime and the lower berth is convertible into comfortable seats. The conversion from one type of accommodation to another—that is, from day to night use or vice versa—may be performed in a comparatively short period of time. The intermediate berth is counterbalanced with the counterbalancing equipment entirely screened from the occupants' vision.

Very compact toilet facilities utilizing a minimum of space are conveniently located in each room, and they are so designed that when they are not intended to be used they may be made unavailable to the passengers. A unique dental faucet constitutes a part of the toilet facilities for each room and requires a minimum of space.

Access into the upper and intermediate berths may be had with the greatest ease and safety by the use of a ladder conveniently located. This ladder is in place for use throughout the entire night, so as not to require the services of the porter in the event an occupant of an upper or intermediate berth wishes to descend, and it is so arranged that it can readily be moved out of the way of those persons using the floor area in the room. In the daytime, the ladder is conveniently stored in an out-of-the-way place.

The curtains closing the berths are arranged to give the maximum degree of privacy to the occupant, and mey be applied with the least amount of time required. Adequate provisions are made for hanging the occupant's clothes at nighttime as well as in daytime.

During daytime travel, an adjustable foot rest is available to each occupant, and, when not in use, each foot rest is moved to a position entirely out of the way. The position of the foot rest may be adjusted to suit the requirements of the user.

Lighting equipment and arrangement and the circulation of conditioned air are intended to provide maximum comfort to the traveler.

The above constitute some of the principal objects and advantages of the present invention, others of which will become apparent from the following description and the drawings, in which Fig. 1 is a plan view of about one-half of the car forming the subject matter of the present invention;

Fig. 2 is a plan view of the other half of the car shown in Fig. 1;

Fig. 3 is a fragmentary perspective view of the car showing a three and a six passenger room made up for day use and the relationship of the rooms with respect to the car aisle;

Fig. 4 is a fragmentary perspective view of the car corresponding to Fig. 3 with the rooms made up for night use;

Fig. 5 is a vertical longitudinal sectional view taken through a three-occupant room and a six-occupant room looking toward the window side of the rooms;

Fig. 6 is a vertical longitudinal sectional view looking toward the aisle, taken through the three and the six-occupant rooms shown in Fig. 5;

Fig. 7 is a vertical transverse sectional view taken through the car showing the arrangement of seats in one of the rooms with the room made up for day use and the foot rest in operative position;

Fig. 8 is a top plan view of the hinged mirror used in the three-occupant rooms;

Fig. 9 is an enlarged perspective view of the bracket which supports the ladder behind the sofa;

Fig. 10 is an enlarged horizontal sectional view of a portion of the hinged panel taken on the line 10—10 of Fig. 7;

Fig. 11 is a fragmentary vertical sectional view taken through one of the rooms showing the berths made up for night use and in broken lines indicating the ladder in position for use;

Fig. 12 is a vertical longitudinal sectional view taken through one of the six-occupant rooms, showing the three berths in position for night use, with the ladder in place, and looking toward the window side of the room;

Fig. 13 is a side elevational view of the curtains for the upper berth, the view being taken from the inside of the berth and looking at the inner face of the curtains;

Fig. 14 is a side elevational view of the curtains for the intermediate and lower berths, the view being taken from the inside of the berths looking toward the inner face of the curtains;

Fig. 15 is a vertical sectional view taken through the upper and lower curtains in their assembled positions on the berth;

Fig. 16 is a vertical sectional view through the curtains for the intermediate and lower berths taken on the line 16—16 of Fig. 14;

Fig. 17 is a vertical longitudinal sectional view taken through the car at the aisle on the line 17—17 of Fig. 11, showing the curtains closed for night use, and in broken lines indicating the air distribution system for the three and six-occupant rooms, a portion of a curtain being broken away in the six-occupant room to show the placement of the headboard;

Fig. 18 is an enlarged vertical sectional view taken lengthwise through the berths and showing the shelves provided in the intermediate and lower berths and the head rest applied at the aisle side of the berths, a portion of the berths being broken away;

Fig. 19 is an enlarged horizontal sectional view taken on the line 19—19 of Figs. 18, and showing the light excluder;

Fig. 20 is an enlarged vertical sectional view taken through one of the convertible sofas taken on the line 20—20 of Fig. 7;

Fig. 21 is a vertical sectional view corresponding to Fig. 20, but showing the arm rest in position for day use and showing the seat moved to the reclining position;

Fig. 22 is a vertical sectional view taken on the line 22—22 of Fig. 7 showing the arm rest in position for day use and the means for fastening the sofa back in the daytime position;

Fig. 23 is a vertical sectional view through the convertible sofa taken on the line 23—23 of Fig. 25 and showing the sofa back folded down for nighttime use;

Fig. 24 is an enlarged vertical sectional view taken through the arm rest on the line 24—24 of Fig. 23;

Fig. 25 is a fragmentary vertical transverse sectional view through the room portion of a car showing in front elevation the convertible sofa in condition for night use, the view being taken on the line 25—25 of Fig. 23;

Fig. 27 is an enlarged vertical sectional view taken through a portion of the convertible seat on the line 27—27 of Fig. 23;

Fig. 28 is an exploded perspective view of the convertible seat showing the elements making up the complete assembly;

Fig. 29 is an enlarged vertical sectional view taken crosswise of the upper and intermediate berths showing in solid lines the relative positions of the upper and intermediate berths when in their daytime position, and indicating in broken lines the intermediate berth in position for night use with a counter-balancing mechanism associated with the intermediate berth;

Fig. 30 is an enlarged detail view of a portion of the upper and intermediate berths taken on the line 30—30 of Fig. 29;

Fig. 31 is a sectional view taken on line 31—31 of Fig. 29 showing the upper and intermediate berth arrangements when they are in position for night use, portions of the figure being broken away;

Fig. 32 is an enlarged detail view of a portion of the upper and intermediate berths when they are in their daytime position and taken on the line 32—32 of Fig. 29; and Fig. 33 is an enlarged detail view of the wall bracket which supports the intermediate berth in its day position.

Figure 26:
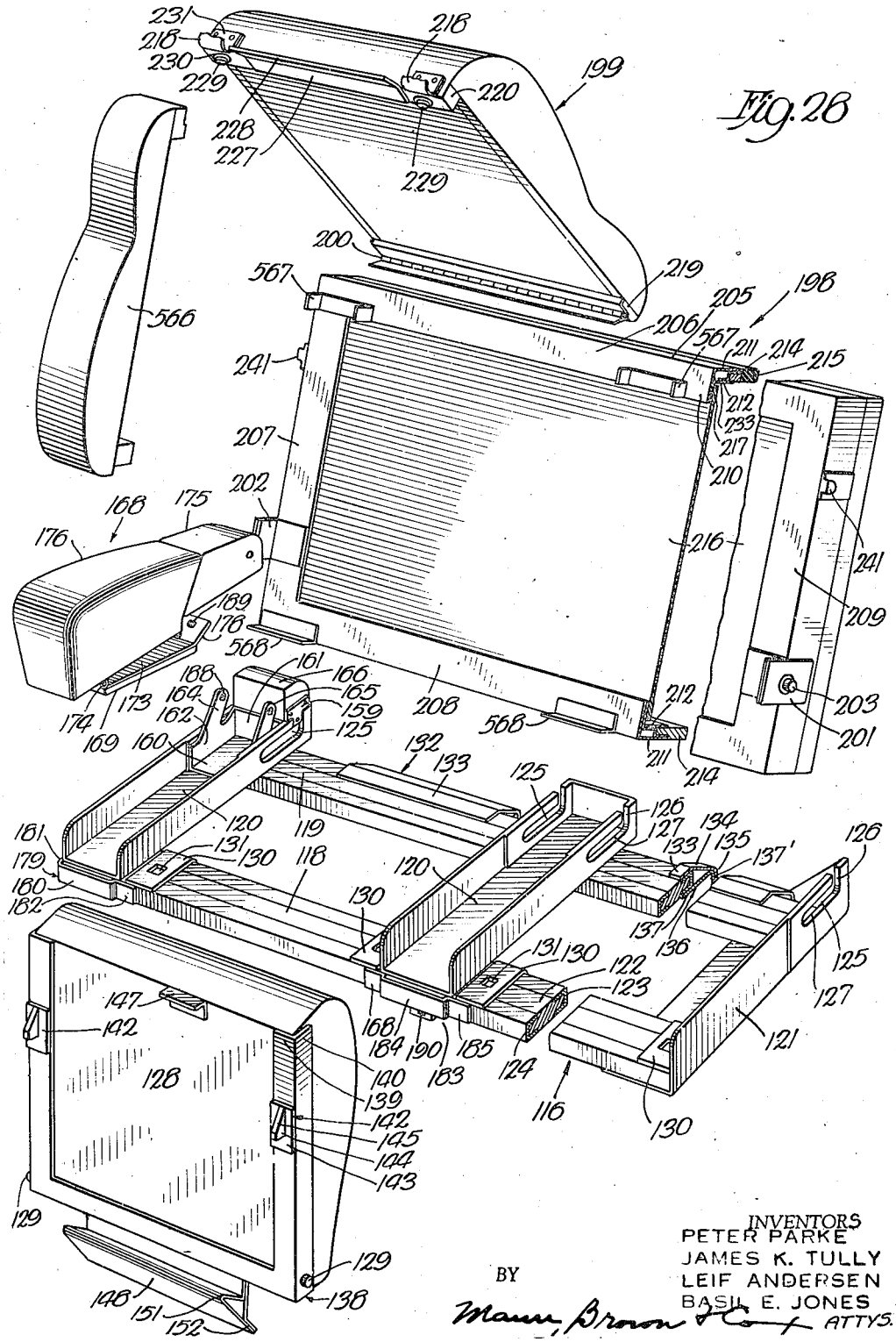
Fig. 26 is a vertical sectional view taken lengthwise through the convertible sofa back when it is in its lowered position for nighttime use, the view being taken on the line 26—26 of Fig. 23.

Specific embodiments of the present invention are selected for the purpose of complying with section 4888 of the Revised Statutes. Obviously, many modifications may be made without departing from the scope of the present invention.

GENERAL ORGANIZATION

CAR BODY ARRANGEMENT

Referring to Figs. 1–3, inclusive, the car body 50 is shown having a floor 51 (Fig. 3), a pair of sides 52 and 53, and a roof 54. No attempt has been made to show the underframe and trucks or any structural details of the car framing.

Referring to Figs. 1 and 2, an aisle 55 extends the full length of the car adjacent to car side 52, and at each end of the car is a passageway door 56 leading from the aisle onto the platform 58, in the case of one end of the car, or onto the treadplate (not shown) between coupled cars at the other car end. The vestibule 58 is provided with doors 59 which open to the outside of the car and the usual trap doors 60 cover steps leading down from the vestibule platform. A passageway opening (not shown) in the car end wall gives access to and from the adjoining car.

The floor plan arrangement of the car includes a plurality of three and six-occupant rooms, referred to at "A" and "B," respectively, spaced throughout the greater portion of the car length and placed adjacent to the car side wall 53. At the opposite ends of the car are toilet facilities intended for use by the men and women, respectively, occupying the car, the men's facilities being indicated at 64, and the women's at 65. The men's facilities include a small room 66 equipped with a hopper 67, a door 68 closing this room from the aisle and two lavatories 69 and 70, separated from each other by a partition 71, and each closed from the aisle by a curtain 72. Each lavatory is provided with a wash basin 73.

At the opposite end of the car, the women's facilities include a small room 74 provided with a hopper 75. A door 76 closes this room from the aisle. Two lavatories 77 and 78 are placed adjacent to room 74, and each is provided with a wash basin 79. A folding partition 80 separates each of the lavatories from the aisle. Locker space and equipment cabinets, generally indicated at 110 and 111, are placed at the opposite ends of the car. A portion 112 of the storage space 111 serves as a baggage storage compartment, and a door 113 opening from the outside of the car provides access into this storage space.

In the car side wall 52 are windows 81, and in the wall 53 windows 82 are located to give proper lighting to the rooms and to provide the passengers with suitable window areas.

Fastened to the side wall 52 of the car at each side post is a folding seat 83, which is normally held by a spring against the wall, but which can be pivoted to a horizontal position for use as a seat.

GENERAL ROOM ARRANGEMENT

Adjoining rooms are separated from each other by a partition 84 which extends from the car side wall 53 across the car to an aisle partition 85. A part of the partition 84 is cut away at 61 (Fig. 7) over the sofa back so that a view throughout the entire car length can be had. Means for closing this opening including a curtain 61' is snap fastened or otherwise secured to the partition 84 over the opening 61, thus closing the opening. The partition 85 is cut away at 62 (Fig. 3) adjacent to the end of each sofa, and an upholstered arm rest 63 is provided on the lower horizontal portion of each partition. Each of the end rooms in the car is closed from the aisle by a partition 86.

The rooms "A", adapted to accommodate three occupants, are equipped with a convertible sofa 87 adapted to form a lower berth (Figs. 1 and 5), an upper berth or bunk 88, and an intermediate berth 89. In order to provide access to the upper and intermediate berths, a ladder, generally indicated at 353, is conveniently arranged in front of the berths at night. This ladder is portable, and during the daytime it is stored in an out-of-the-way place behind one of the sofas. Against the car side wall are toilet facilities, generally indicated at 90, including a foldable wash-basin 449 and a faucet assembly 450, above which is a mirror 91, a shelf 93, and a baggage rack 92. A soiled towel basket 94 is placed to one side of the toilet facilities. Each seat is provided with a foot rest 95 for each occupant. One or two windows 82 per room, depending on the size of the room, are located in car side wall 53. At the opposite ends of the sofa are lighting fixtures 97 for furnishing illumination for the occupants when the room is made up for day use. An intermediate berth light 98 (Fig. 6) is located on the aisle partition at the end of each intermediate berth, and a similar fixture 98' is provided for the upper berth; and overhead lighting fixtures 99, 100, and 101 are situated on the ceiling of each room. Over each mirror 91 is a light 96 directing light downwardly. A plurality of lighting fixtures 107 is spaced throughout the length of the car over the aisle, and over each entrance to the vestibule 58 is a light 108. The lavatories and toilets for both the men and the women are provided with suitable lighting fixtures 109.

The six-occupant rooms "B" are similarly equipped, except that there are two convertible sofas 87 on opposite sides of the room facing toward the center (Fig. 5).

Each room is fully air conditioned, and during the daytime air enters the room through a grill 102 (Fig. 6), located overhead, and vitiated air is exhausted through a port 103 (Fig. 5). When the car is made up for night use, each of the lower berths is provided with a fresh air inlet grill 104; each of the intermediate berths is supplied with fresh air through a grill 105; and each of the upper berths is furnished with air through a grill 106.

Floor heating coils 114 (Fig. 29) pass along the length of the car adjacent to the wall 53, and they are covered in a housing 115 (Fig. 3). Additional heating coils may be provided along the aisle side of the car, if desired.

SPECIFIC DETAILS

CONVERTIBLE SOFA

The sofa in each room is arranged to provide three comfortable seats, with or without arm rests, depending upon the requirements of the individual occupant. Each seat may be individually adjusted to an upright or semi-reclining position to suit the needs of the occupant.

The sofa is supported on a frame generally indicated at 116 in Fig. 28, secured to the side wall 53 of the car and to the aisle partition 85 (Fig. 7) by brackets 117 (Figs. 7 and 25). Bosses 242 project down from the frame through holes in the brackets. This frame comprises a pair of spaced parallel beams 118 and 119 (Fig. 28) extending the full length of the sofa connected by a plurality of channel-shaped guide members 120 and an angle end guide member 121, all of which guide members extend crosswise with respect to the two beams 118 and 119. The angle member 121 is used on the end of the sofa frame adjacent to the aisle side, while the channel members are used in intermediate positions and on the car wall side of the sofa frame.

Each of beams 118 and 119 comprises a wooden core 122 bound on its sides by metal channel members 123 and 124. The seat guides 120 and 121 are fastened to the beams 118 and 119, and are so spaced that a seat cushion fits between two adjoining seat guide members.

The upwardly extending sides of the guide members are provided with slots 125 having downwardly extending portions 126 and horizontal portions 127. A seat cushion 128 fits between contiguous sides of adjoining seat guide members and trunnions 129 on the sides of cushions 128 fit in the slots 125 of the guide members.

Directly adjacent to each guide member on the forward beam 118 of the frame 116 is a seat slide 130, which is an angle member extending across the top of beam 118 and bending downwardly against the inner side of the beam. In the top horizontal flange of the seat slide 130 is a slot 131. These seat slides are provided on each side of the seat cushion area between adjoining seat guide members.

At the back of the frame on the rear beam 119 is a seat back catch slide 132 of irregular shape having a horizontal portion 133 extending over the top of beam 119, a downwardly and rearwardly inclining portion 134, and a vertical portion 135. An angle member 136 is fastened to the inner side of the vertical portion 135 of the slide and has a horizontally extending flange 137 engaging the lower face of beam 119 and a vertical flange 137' engaging the inner face of the vertical portion 135 of the seat back catch slide 132.

The cushion 128 is supported on a frame 138 including angular members having a horizontal flange 139 and a vertical flange 140. These angular members extend along the sides and across the back of the cushion. The cushion itself may be of any suitable type with or without springs, but, as shown, it is made of sponge rubber, which inherently has the necessary resilient properties to provide a comfortable seat. This sponge rubber cushion, shown at 141 in Fig. 20, is covered with a suitable upholstering material 141', and the cushion as a unit is carried on the frame 138.

On the bottom face of the horizontal flange 139 of each angle member 140, along each side of the cushion, is a seat slide stop 142 comprising a plate 143 secured to the flange 139 and a downwardly projecting lug 144 having an inclined surface 145. When the seat is in its normal upright position, the cushion 128 is in place between the contiguous sides of the seat guide members 120, or, in the case of the end cushion, between the upright flange of the end seat guide member 121 and the contiguous flange of intermediate guide member 120.

Referring to Fig. 20, the seat is supported on the seat slides 130 underneath the front end of the cushion and on the rear beam 119 of the sofa frame. The seat slide stops 142 assume a position directly behind the seat slide 130 in the space between the two beams 118 and 119.

When the seat is moved to the semi-reclining position shown in Fig. 21, the seat cushion 128 is pulled forward, during which time the lug 144 on each seat slide stop 142 engages its corresponding seat slide 130. As the cushion is moved forward, the inclined surface 145 of lug 144 moves along the seat slide 130, raising the forward edge of the cushion. As the cushion is pulled further forward, the lug moves across the top surface of the seat slide 130 until it fits into notch 131 in this surface. The seat cushion is thus moved to the semi-reclining position of the seat. An angle grasp 147 is secured to the underneath face of the seat cushion 128 directly adjacent to the front edge thereof, and this grasp provides means for manipulating the seat cushion.

Along the back edge of the seat cushion 128 is a seat back catch 148, hinged at 149 to the upwardly extending flange 140 of the cushion frame 138. This seat back catch has a heel portion 151, which engages the vertical, inclined, and horizontal upper surfaces of the seat back catch slide 132 (Figs. 20 and 21) during the movement of the seat cushion from the normal position shown in Fig. 20 to the semi-reclining position shown in Fig. 21.

When the seat is in its normal position, the seat back catch is substantially horizontal, as shown in Fig. 20, with the heel 151 engaging the vertical surface of the seat back catch slide 132. As the cushion 128 is moved forward, the heel 151 rides up the inclined surface 134, causing the seat back catch to rotate in a counter-clockwise direction about the pivot point of hinge 149, thereby raising the seat back catch. When the seat cushion 128 assumes the semi-reclining position shown in Fig. 21, the heel 151 of the seat back catch is supported on the horizontal surface 133 of the slide 132, and the seat back catch thereby assumes a substantially vertical position (shown in Fig. 21). Extending outwardly from the end of the seat back catch is an arm 152.

Referring to Figs. 20 and 21, when the seat cushion 128 is being adjusted from the upright position to the inclined position, the trunnion 129 moves from the rear of slot 125, as shown in Fig. 20, to the forward end of the slot, as shown in Fig. 21. The extremities of the slot 125 limit the movement of the seat cushion 128. To entirely remove the cushion, the trunnion is moved to the rear of the slot and then raised through the vertical portion 126 of the slot. A plate 159 (Fig. 28) is secured to each end of block 166 and blocks the opening at the top of slot 125. This plate must be removed before the seat cushion can be removed.

The channel-shaped seat guide members 120 serve as casings into which arm rests 168 are folded (see Fig. 28). In each of these guide members 120 is a channel-shaped arm rest support bracket 160 having a rear flange 161 and two side flanges 162 and 163. (Fig. 28). Extending upwardly from the side flanges are projecting arms 164 and 165. The arm rest support bracket is spaced from the end of the seat guide member 120, and, as best shown in Fig. 23, a block 166 is inserted between the support and the end of seat guide member 120. This block is upholstered at 167 (Fig. 23) in any suitable manner.

The arm rest 168 (Fig. 28) fits between the upwardly extending flanges of the channel guide member 120 and comprises back, intermediate and front members 175, 176 and 169 respectively. The back and intermediate members 175 and 176 are hinged together at 172 (Fig. 23) and the intermediate and front members 176 and 169 are hinged together at 174.

The intermediate member 176 serves as the arm support when the arm rest is in its raised position, the back and front members 175 and 169, respectively, supporting the intermediate member in its raised position. The back member 175 serves to close the space between the seat cushions directly in back of the intermediate arm rest member 176 when the arm rest is folded into the seat guide member 120. The front member 169 folds back underneath the intermediate member when the arm rest is lowered into the guide 120.

The forward member 169 comprises a plate 173 to the outer face of which is secured a block 173'. Suitable upholstering material covers this block.

The free end of the front plate 173 is provided with a flange 178 extending beyond the block 173' at an angle with respect to the plane of the plate 173.

The intermediate arm rest support member 176 comprises a base 193 (Fig. 23) on which is mounted an irregularly shaped supporting member 194. Sponge rubber 195 or other suitable cushion material covers the supporting member 194.

The back member 175 of the arm rest 168 comprises a supporting block 196 on which is secured a cushion 197 of rubber or the like.

Suitable upholstering material indicated at 177 covers the back and intermediate members.

Referring again to Fig. 28, adjacent to the end of the frame along the front edge of beam 118 of the seat frame and directly below the channel-shaped seat guide member 120 is an end arm rest support bracket 179. This bracket is an angle member having a front flange 180 and a side flange 181, the latter of which is secured to the end of beam 118. The front flange 180 of the bracket has an outwardly offset portion 180' spaced from the beam 118 across the area directly below the seat guide member 120, and is secured to the forward flange of beam 118 along the flange 182.

Directly below the intermediate channel-shaped seat guide members 120 are intermediate arm rest fastening brackets 183 having an intermediate outwardly offset portion 184 spaced from the forward edge of beam 118 directly below the seat guide member 120, and flanges 185 and 186 extending beyond the ends of the intermediate portions 184 and secured to the forward edge of beam 118.

As best shown in Fig. 22, the arm rest 168 is provided with trunnions 187 on the opposite sides of the back member 175, which are journaled in slots 188 in the upper ends of projections 164 and 165 on the arm rest support bracket 160. When the arm rest is in position for use, it is raised out of the seat guide member 120 with the intermediate arm rest cushion member 176 spaced in horizontal relationship above the seat and the back and front members 175 and 173, respectively, extending substantially vertically downward from the intermediate member. The projecting flange 178 on the end of plate 173 is inserted in the opening in bracket 179 (in the case of the end arm rest, or in bracket 183 in the case of an intermediate arm rest support).

As best shown in Fig. 28, a slot 189 is placed in flange 178 of the arm rest 168, and, when the arm rest is in position for use, a dead-bolt 190 (Fig. 22) is moved forward and inserted in slot 189 to lock the arm rest in position.

The arm rest 168 is lowered into the seat guide member 120 by first unlocking the dead-bolt 190 and raising the flange 178 of the plate 173 out of the arm rest support bracket. Then, as shown in Fig. 23, the plate 173 is folded under the end and intermediate sections 175 and 176 of the arm rest 168, and the assembly is lowered into the seat guide member 120.

The forward edge of the back member 175 of the arm rest 168 is inclined at 191, and the rear end of the intermediate member 176 is similarly inclined at 192, so that when the arm rest is in place in the seat guide member 120 these two inclined surfaces become complementary to each other, so that there is only a slight crack between the intermediate and the back members 176 and 175, respectively.

When the arm rest is not in use and is folded into the seat guide member 120, the top surface of both the intermediate and the back members 176 and 175, respectively, are flush with the seat cushion, and the front edge of the intermediate member 176 is flush with the front edge of the seat cushion, so that, in effect, when in its collapsed position, the arm rest forms a part of the seat cushion.

The sofa back is best shown in Figs. 20–23, inclusive, and 28, and includes a lower berth member 198 to which is hinged each seat back cushion 199 by means of a hinge 200. Between adjoining seat back cushions is a spacer 566 supported on the lower berth member 198 by a bracket 567 and an angle bar 568 at the opposite ends, respectively, of the spacer. The lower berth member has trunnion brackets 201 and 202 along the opposite sides thereof, each of which carries a trunnion 203. To the car side wall 53 and the aisle partition 85 are secured pivot brackets 204 (Figs. 22 and 26), in which the trunnions 203 are journaled. In this manner, the lower berth member or sofa back 198 is pivoted about a horizontal axis so that it can assume an upright position shown in Fig. 20, or it can be rotated to a horizontal position shown in Fig. 23.

The structure of the berth member 198 is best shown in Figs. 20 and 28, and includes a frame 205 having angle members 206–209, inclusive, each having a horizontal flange 210 and a vertical flange 211. To the other inner faces of these angle members are secured irregularly shaped angle members 212 having flanges which engage the inner surfaces of the flanges of the corresponding angle members 206–209, inclusive. A filler 213 is inserted between the irregularly shaped angle members 212 and each of the corresponding angle members 206–209, inclusive. To the upper edge of the flanges 211 of each angle member is secured a wooden member 214, which serves as one side of the lower berth. To the inner face of each side is secured a plate 233. Across the upper or front edge of the frame 198, the side 214 is of lesser height than in the case of the ends and back edge of the frame, and a rubber padding 215 is mounted on the top of the wooden member 214, so as to provide a cushion along this edge of the frame. The bottom of the frame is closed by canvas 216, reinforced along its edges at 217 and secured to the inner face of the lower flanges of the angle members 206–209, inclusive.

As best shown in Fig. 20, the seat back cushion 199 is hinged to the inner flange 210 of the angle member 206, and this seat cushion, pivoting about the hinge 200, may be moved away at the bottom from the lower berth frame 198, assuming the position shown in Fig. 21. Straps 218 limit the amount of this movement.

The seat back cushion is made up of framing members 219 and 220 at the top and bottom, respectively (Fig. 20) and 221 and 222 (Fig. 26) along the sides of the seat back.

A frame made up of angle members 223 is secured to the framing members 219—222, inclusive. To this frame is secured a sheet 224 (Fig. 20), which completes the frame for the seat back.

To the frame is secured sponge rubber 225, or other suitable resilient material to give the necessary cushioning to the seat, and upholstering 226 may be used to cover the rubber.

Extending downwardly from the lower edge of the seat back is a bracket 227, which projects below the seat back at 228. To the inner face of the bracket is attached a bumper 229, which is covered by a bumper shield 230.

A strap retainer 231 is secured to the bottom face of the framing member 220, and a second strap retainer 232 secures the other end of the strap to the lower edge of the lower berth frame.

When the seat is in its upright position, the seat cushion 128 and the back 199 assume the position shown in Fig. 20, with the seat back catch 148 substantially horizontal. As the seat cushion 128 is moved forward, as previously described, to assume the semi-reclining position, the seat back catch rotates counter-clockwise about the hinge 149, and the arm 152 of the catch engages the bracket 228 extending downwardly from the lower edge of the seat back 199. As the forward movement of the seat cushion 128 proceeds, this arm pulls the lower edge of the seat back 188 forward, rotating the seat back about its hinge 200. When the seat has been moved to its semi-reclining position shown in Fig 21, the seat back catch 148 assumes a vertical position, and the arm 152 on the end thereof supports the lower edge of the seat back 199 away from the berth frame 198, the straps 218 limiting the degree of movement of the seat back 199.

When the sofa back, which includes the lower berth frame 198 and the seat back 199, is in its daytime position, it is held against the room partition 84 (Fig. 22) by a latch 235 pivoted to a latch case 236, the latter of which is secured to the room partition 84. Latch 235 engages a keeper 235' situated on the upper edge of the berth frame adjacent to each end thereof. When the sofa back is rotated to the horizontal position shown in Fig. 23, it forms a lower berth 239. A mattress 237 is permanently held in the lower berth frame 198 by straps 238. Referring to Fig. 25, supporting members 241, attached to the ends of the lower berth 239 adjacent to the forward edge thereof, rest on brackets 240. Brackets 240 are fastened to the car side wall 53 and the aisle partition 85, respectively.

BERTH STRUCTURE AND OPERATION

The berths are so arranged that they may be fully made up with the proper bedding. Thus, the porter is not required to make up beds at night when he is converting the car into a sleeper for night use. Much time is thereby saved, and the porter merely is required to assemble the berths for night use.

Upper berth structure

The upper berth 88 (Figs. 12, 30–32, inclusive) is permanently fixed in place and rests on angle brackets 244 attached to the car side wall 53 and aisle partition 85. Angle brackets 245 are disposed at the ends of the berth, one flange 246 of each of which is secured to the berth while the other flange 247 rests on the angle bracket 244.

The upper berth comprises a rectangular frame made up of upwardly opening angle members 248 and a canvass sheet 249 forms the bottom of the berth and is secured to the horizontal flanges of the angle members 248. The upright flanges 250 of the angle members 248 form the sides of the berth frame, and a sponge rubber mattress 251, or some other suitable type of mattress is permanently held in place in the berth frame.

Referring to Figs. 7 and 11, the relative position of the upper berth with respect to the cross section of the car is shown, and the space between the top of the mattress and the car roof is ample to provide maximum comfort to the occupant.

As best shown in Figs. 7 and 32, across the front edge of the upper berth extends a curtain rod 252 having an upper rung 253 and a lower rung 254 extending the full length of the bar, from which the lower and intermediate berth curtains are suspended.

Intermediate berth structure

The intermediate berth 89 (Fig. 31) is made up of an intermediate berth pan 263 comprising a bottom sheet 264 having upright sides 265 and front and back upright members 266 and 267, respectivly (Figs. 5 and 29).

Referring to Fig. 31, the berth pan is pivoted to the car side wall 53 and the aisle partition 85 about pivot points 267 and 268, supported on the car side wall 53 and the aisle partition 85, respectively. When in its closed daytime position, the berth pan 263 is held in a substantially horizontal position directly below the upper berth, as shown in Fig. 29, by a bracket member 268 on each end of the berth pan.

Referring particularly to Fig. 33, each bracket 268 comprises a bracket casing 269 which fits into a well in the wall and has a peripheral flange 270, through which the casing is secured to the wall. Extending outwardly from the inner face of the casing 269 is a lug 271 having an opening 272 adjacent to its outer edge. The bracket 268 is pivoted to the casing 269 at 273 about a vertical axis, so that this bracket may be swung about the pivot point into the closed position in which the outer surface 274 lies flush with the outer surface of the peripheral flange 270. An arm 275 is pivoted to the bracket 268 on the inside thereof about a vertical axis 276. The arm 275 extends inwardly into the casing 269 and through the opening 272 in lug 271. A coil spring 277 surrounds the arm 275 and is held between the lug 271 and a shoulder 278 on the arm 275.

When the bracket 268 is in its open position, as shown in Fig. 33, the spring 277 is compressed between the shoulder 278 and the lug 271 to urge the bracket in its open position. When closing the bracket 268, force is applied to overcome the force of spring 277 and move the bracket in a counter-clockwise direction about pivot point 273. During the closing of this bracket, pivot point 276 rotates about pivot point 273 until it reaches dead center in line with the pivot point 273 and the opening 272 in lug 271, at which time the effect of the spring 277 in maintaining the bracket 268 in open position is overcome. Upon further closing of the bracket 268, pivot point 276 moves to a point inwardly of dead center position, so as to apply counter-clockwise force on the bracket 268 to urge the bracket in the closed position. Thus, the effect of the spring when the bracket 268 closely approaches the closed position is to snap the bracket to and hold it in the closed position.

An intermediate berth 279 closes into and is held by the intermediate berth pan 263, and comprises a frame having angle members 280 (Figs. 29–31, inclusive) secured together in the form of a rectangle with a sheet of canvas 281 closing the bottom of the rectangular frame and secured to the angle members 280. The intermediate berth frame is pivoted to the side walls 265 of the intermediate berth pan 263 at 282 and 283 adjacent to the front edge 266 of the berth pan. Brackets 284 and 285 are secured to the opposite sides 280 of the berth pan, and each has a centrally inwardly offset portion 286 to which the intermediate berth is journaled. As best shown in Fig. 12, a chain 287 at each end of the intermediate berth is secured to the outer end of the intermediate berth at one end and to the outer end of the stationary upper berth 88 to suspend the outer edge of the intermediate berth from the upper berth. A mattress 288 is held in the intermediate berth frame.

In Fig. 29, the intermediate berth is shown in its closed position housed in the intermediate berth pan 263 held against the underneath face of the upper berth by brackets 268. A plate 289 is fastened to the underneath face 264 of the intermediate berth pan adjacent to the bracket 268 at each end of the berth. To lower the intermediate berth, an upward force is applied under the front edge of the berth pan, and the brackets 268 on both sides of the berth are snapped to their closed position. The berth is then allowed to rotate downwardly in a counter-clockwise direction about its pivot points 267 and 268 (Fig. 31) until it assumes the vertical position shown in dotted lines at 290 in Fig. 29. Latches 291 engaging catches 292 on the outer edge of the berth pan hold the intermediate berth pan in this vertical position. The intermediate berth is held in the intermediate berth pan by a latch 259 (Fig. 30) fitting into a slot 258 in each side of the intermediate berth pan. When lowering the intermediate berth, it is first unlatched; then rotated about its pivot points 282 and 283 (Fig. 31) until it assumes the horizontal position shown in dotted lines 293 in Fig. 29, the chain 287 supporting the outer edge of the berth.

The intermediate berth pan with the weight of the intermediate berth is counter-balanced at each end by a coil spring 294 (Fig. 29), which extends at right angles to the berth and is fastened at one end to a bracket 295, secured to a wall of the room. A chain 296 is attached to the opposite end 297 of spring 294 and passes over a sprocket wheel 298 journaled to the room wall, and then downwardly to a chain clevis 299 pivoted to one of the side walls 265 of the intermediate berth pan at 300. A counter-balancing spring 294 is provided at each end of the intermediate berth pan, so that two of such springs serve to counter-balance the weight of the intermediate berth.

A housing 301 (Figs. 29 and 32) enclose the counter-balancing springs for intermediate berths on opposite sides of the room (in the case of the six-occupant room), in which case spring 294 (Fig. 32) serves to counter-balance half of the weight of one of the intermediate berths and spring 294' counter-balances half of the weight of the intermediate berth on the other side of the room. The spring casing 301 is secured to the car wall by screws 302. In this manner, the bulk of the counter-balancing equipment is completely enclosed.

The springs 294 are so arranged that the weight of the intermediate berth overcomes the spring action when the berth assumes a position midway between the closed and open position, so that when lowering the intermediate berth its weight permits it to drop to a position substantially at an angle of 45 degrees with respect to the horizontal, and force is required to place the berth in the vertical position 290 against the room partition 84.

The rod 243 is fastened to the front edge of the intermediate berth, and the curtain is secured thereto.

In order to simulate as nearly as possible the open car, the opening 61 (Fig. 3) in the partition 84 separating adjoining rooms should be as large as possible and extend down approximately to the tops of the sofa seat backs.

Referring to Figs. 5, 6, and 12, a panel 303 is hinged to each partition 84 directly behind each sofa back by means of hinges 304 secured to brackets 305, which in turn are fastened to the partitions 84. Each panel 303 is provided with a strip of rubber 306 across the top edge of the panel on the outer face thereof when the panel is in its raised position against the partition 84, so that when the intermediate berth pan 263 is lowered as shown in Fig. 12, the rubber seals the crack between the panel 303 and the lower edge of the berth pan.

The strip of rubber 306 also serves as a bumper between the panel 303 and the partition 84 when the partition is in its lowered position, thereby reducing vibrations which may otherwise be present.

Vertical strips of rubber 307 and 307' (Fig. 7) extend along the vertical edges of the panel on the inner side thereof when it is in its raised position, thereby sealing the panel against the partition 84 on each side of the cut-away portion 61 of the partition. Springs 581 (Fig. 7) along the hinged edge of panel 303 resiliently hold the panel in its lowered position, thereby eliminating any rattling or vibration of the panel against the partition 84.

Headboard panel

A headboard panel 308 (Figs. 4, 11, 17, and 18) fits at the end of the berth on the outside to fill out the aisle partition when the berths are made up for night use. A pair of fingers 310 are secured to the panel at the bottom and project below the lower edge thereof, and a pair of brackets 311 are secured to the aisle partition on the room side thereof and directly below an arm cushion 312 at the aisle end of the sofa.

The projecting fingers 310 are inserted in the brackets 311 when the headboard is placed in position at the end of the sofa, and a finger 313 along the side of the panel is inserted in a bracket 314 located on the inner face of the aisle partition (Fig. 11). With the panel in place, a bolt 315, secured to the panel by brackets 315', is raised into the keeper 316 on the aisle partition, locking the headboard in place.

BERTH OPERATION

The operation of the berths is as follows:

Assuming that the berths are in their position for daytime use, as shown in Fig. 6, and one or more seats are in their semi-reclining position, the first operation which the porter performs to convert the equipment into berths for night use is to place the adjustable seats in their normal upright position shown in Fig. 20. The headboard 308 is first inserted in place at the end of the sofa in the aisle partition. The sofa back 199 is then unlatched at the top at 235 (Fig. 22) and rotated in a counter-clockwise direction about its pivot 203 (Fig. 28) until it comes to rest on the wall brackets 240 (Fig. 5), which previously will have been moved out from the wall to assume an angle of approximately 90 degrees with respect to the wall. Next, the hinged panel 303 (Fig. 22) is moved up to close the lower part of the opening 61 (Fig. 12), and then the intermediate berth pan 263 (Fig. 29) is unlatched by rotating the brackets 268 into their wall recesses. The intermediate berth pan is then lowered to the vertical position shown in dotted lines 290 in Fig. 29 and latched in place. The intermediate berth 293 is then unlatched at 259 and rotated down to the horizontal position shown in dotted lines 293. Inasmuch as the upper bert is stationary, the three berths are now in position for use.

CURTAINS

Aisle curtains

Referring to Figs. 3, 4, 7, and 11, curtains 585 are provided at the open side of each room along the aisle partition 85 to completely close off the room from the aisle when privacy is desired. Along the top of the curtains 585 is a plurality of follower members 586 riding along a track 587. Each curtain along its outer edge 587 (Fig. 4) is fastened to the aisle partition 85 at 588 by snap fasteners or other suitable means. The curtains for each room are divided into pairs, coming together at the center of the passageway leading into the room, and are buttoned at 589 from the inside. When the curtains are moved, they ride on the track 587, and during the daytime, when they are not in use, they are drawn back on each side of the passage leading into the room and are held against the aisle partition 85 by straps 590 looped around the curtain and snapped, or otherwise fastened in place.

Between the curtain 585 when it is in its closed position and the headboard panel 308 adjacent to the aisle side of one of the sofas is a bracket 591 (Fig. 11) notched at 592, 593, and 594 to receive three clothes hangers (not shown). This space between the plane of curtain 585 and the headboard panel 308 forms a place to hang suits, dresses, overcoats, and the like; and, when the room is made up for night use with the aisle curtains 585 drawn closed, clothes hanging from the bracket 591 are entirely enclosed within the room.

Berth curtains

Referring to Figs. 12-16, inclusive, the berths are provided with upper and lower curtains 595 and 596, respectively.

Each upper curtain 595 encloses an upper berth, and is made up of two segments 597 and 598. Referring to Figs. 7, 11, and 13, a rod 599 is attached to the ceiling of the car and extends lengthwise to the upper berth from the vitiated air duct 584 to the conditioned air duct 582. Adjacent to the top edges of segments 597 and 598 of the upper berth curtain 595 is a plurality of hooks 600, which support the upper curtain on rod 599. The upper edge of the curtain is reinforced at 601. The curtain segment 598 is cut out at 608 (Fig. 13) to fit the curtain around the exhaust air duct 584, and a hook 609 hooks onto an eyelet 610 fastened onto the car wall (Fig. 11) to support the end of the curtain segment.

As best shown in Figs. 12 and 15, the upper berth curtain 595 extends below the upper berth 88. Adjacent to the upper rung 253 of rod 252 on the outer edge of the upper berth is a strap 602 for each of the segments 597 and 598 of the upper berth curtain 595. Each of these straps 602 extends substantially the full width of its corresponding curtain segment, and is stitched or otherwise secured to the curtain segment at 603, and buttons 604 are spaced across each strap directly below the line of stitching. Buttonholes 605 are placed along the lower edge of each strap 602, and, when each curtain segment is in place suspended from the rod 509, the strap 602 is wrapped around the upper rung 253 of the rod 252, and then buttoned, as best shown at 606 in Fig. 15. Thus, the upper berth curtain segments serve as safety belts to prevent the occupant of the upper berth from rolling out or being tossed out of the upper berth. The segments 597 and 598 come together substantially midway between the ends of the berth and are buttoned together at 607 (Fig. 13).

The lower curtain 596 comprises segments 611 and 612, across the top of each of which is a strap 613, secured to the curtain segment at 614, which wraps around the lower rung 254 of the rod 252 and buttons at 615 (Fig. 15). Each of segments 611 and 612 extends from the lower rung 254 of the rod 252 to somewhat below the lower berth 198. The segments 611 and 612 come together along a vertical line intermediate the ends of the berths and are buttoned at 616 (Fig. 14). The segments are slit horizontally adjacent to the intermediate berth to form flaps 617, which project below the plane of the intermediate berth at 618. The lower portions 619 and 620 of segments 611 and 612, respectively, across their top edges where the flaps 617 are cut away, are provided with straps 621 secured to the lower portions of the segments 611 and 612 and wrapped around rod 243, extending lengthwise along the outer edge of the intermediate berth. Straps 621 are buttoned in place at 622 (Fig. 15).

The curtain segments 611 and 612 across the area where they are not slit are fastened to rod 243 by means of straps 623 secured to the inner face of each curtain segment and buttoned to the curtain at 624 (Fig. 16). The separations between the various curtain segments for the upper, intermediate, and lower berths substantially midway between the ends of the berths provide means for giving access to and from the berths.

Referring to Fig. 11, a shoe pocket 625 is fastened to the outside of upper curtain segment 597; a second shoe pocket 626 is fastened to the upper portion of segment 612 of the curtain; and a third shoe bag 627 is secured to the lower portion 620 of curtain segment 611. These shoe pockets 625, 626, and 627, are intended for use of the occupant of the upper, intermediate, and lower berths, respectively. When these occupants have retired to their respective berths, they may place their shoes in the pockets intended for their use, conveniently reached from the berth.

Extending downwardly from the upper berth curtain segment 597 are a pair of clothes hangers 628 and 629, secured to the curtain segment 598 on the inside face thereof by straps 630. One of these hangers is intended for the use of the occupant of the upper berth, and the other for the occupant of the intermediate berth. To the segment 611 of the lower berth curtain 596 is a clothes hanger 631 attached to the outer face of the berth segment adjacent to the intermediate berth by a strap 632. This latter clothes hanger is intended for the use of the occupant of the lower berth.

SHELF

In the intermediate area adjacent to the car side wall 53 is a shelf indicated at 633 in Figs. 12 and 18. This shelf comprises a relatively stiff rectangularly shaped back member 634 suspended from the car wall 53 by eyelets 635 and 636. Safety hooks 637, fastened at the upper edge of the back members 634, hook onto the eyelets 635 and 636 to support the back member. This back member 634 extends from the extreme upper region of the intermediate berth to well below the mattress 288. A shelf member 638 extends diagonally outwardly from the back member 634 and is pivoted to the back member at 639. A pair of straps 640 and 641, extending from the outer edge of the shelf member 638 to the back member 634 adjacent to the top thereof, support the shelf member 638 in its extended position shown in Fig. 18. The shelf member is reinforced by a frame 642 stiff enough to support various articles of clothing and the like which may be placed on the shelf by the occupant of the berth.

A similar shelf 643 is provided in the lower berth on the side adjacent to the car side wall 53. In this instance, the shelf is suspended by means of hooks 644 from the edge of the intermediate berth. The back members 634 of the shelves for both the intermediate and the lower berths are substantially as wide as the berths themselves so as to effectively shut out light which may otherwise enter through the end of the berth.

LIGHT EXCLUDER

At the aisle end of the intermediate berth there is a gap between the end of the berth and the headboard 308 and aisle partition 85, as best shown at 645 in Figs. 18 and 19. To close this gap and exclude light from passing into the lower berth from the intermediate berth, a light excluder, generally indicated at 646, is attached to the end of the intermediate berth. This light excluder includes a plate 647 attached to and extending upwardly from the end of the intermediate berth, to which is hinged at 648 a light excluding plate 649, which may be pivoted about a horizontal axis through the hinge 648 to be moved from the substantially vertical position shown in dotted lines 650 in Fig. 18 to the horizontal position shown in solid lines. Across the free long edge of the light excluding plate is a strip of rubber 651, which, when the plate 649 is in its horizontal position, engages the headboard 308 and the aisle partition 85 (Fig. 19) to effectively seal the space 645 between the berth and the headboard panel and aisle partition. As best shown in Fig. 19, the distance from the berth to the aisle partition 85 is greater than the distance from the berth to the headboard panel 308, so that the portion of the light excluder 646 closing the gap to the aisle partition 85 is of greater height than that portion closing the gap between the berth and the headboard 308. The light excluding plate 649 is moved to the dotted line position 650 (Fig. 18) when the berth is to be returned to its closed day-time position.

MIRRORS

In each of the six-occupant rooms, the mirror 91 is located between the adjoining windows and is a stationary mirror. In the three-occupant rooms, however, the mirror is placed closely adjacent to the room partition 84, and, in order to afford the greatest amount of utility, the mirror is hinged at 565 (Figs. 5 and 8) along the vertical edge farthest removed from the partition 84, so that the mirror may be swung away from the wall.

A friction member 574 operates between the mirror 91 and the car wall 53, and is attached to the top edge of the mirror 91 by a bracket 575 and to the wall 53 by a bracket 576. This friction device 574 is of any well known type, and, since it forms no part of the present invention, a detailed description is not believed necessary. Its purpose is to maintain the mirror 91 in any angular position with respect to the car wall 53 to which the mirror may be moved, so that the occupant using the mirror may swing it out from the wall to any desired angular position, thereby adapting the mirror to suit his own needs.

A rubber bumper 577 is placed on the inner face of the mirror to engage the wall 53 when the mirror is in its closed position. Extending downwardly from the lower edge of the mirror is a grasp 578 on which force is applied to swing the mirror 91 about the hinge 565. The lighting fixture 96 above the mirror is fastened directly to the mirror adjacent to the top edge thereof.

AIR DISTRIBUTION

The air distribution system is best shown in Figs. 5, 6, 7, and 17. Conditioned air is fed throughout the length of the car through ducts 582 and 583 (Fig. 7), located directly above the aisle 55. The air in the duct 582 passes into each room through the grill 102, and the air in duct 583 passes into each room at various elevations through grills 104, 105, and 106. During the daytime, when the car is made up for day use, the conditioned air is passed through duct 582 and into the rooms through grill 102, during which time a damper (not shown) closes off duct 583 to prevent the passage of the conditioned air through this duct. During the nighttime when the car is made up for night use, the damper is moved to a position to pass the air through the lower duct 583 and prevent passage of air through duct 582. Thus, it is seen that the conditioned air during the daytime is admitted to each room through a single grill 102 in the ceiling area of the car, but at nighttime each berth is provided with a conditioned air grill through which air is admitted from duct 583. Each of these grills 104 to 106, inclusive, may be individually controlled by the occupant of the berth, so that the amount of conditioned air admitted can be adjusted to suit the individual requirements.

The aisle 55 and the remainder of the open car during the daytime, when the partitions 84 are opened at 61, serve as the return air duct, directing the air to the end of the car and through the recirculated air intake (not shown) and back to the blower fan (not shown) at the forward end of ducts 582 and 583. During the nighttime, when the rooms are made up for night use, the openings 61 in partitions 84 are closed by the intermediate berth pans, so that the aisle 55 serves as the return air duct.

On the opposite side of the car from the conditioned air ducts adjacent to the ceiling is a duct 584, through which vitiated air passes and from which it is forced from the car by exhaust fans (not shown). The vitiated air is pulled through the port 103 adjacent to the ceiling in each room, and is carried off through the duct 584.

SUMMARY

A car equipped with the accommodations described herein is known as a "coach sleeper," and presents a very pleasing appearance. If desired, the rooms may be arranged to closely approximate an open coach, so that a clear view may be had throughout the length of the car. When privacy is desired, each room may be closed off from the rest of the car, either in the daytime or at night.

Some of the rooms in the car as described are equipped for three occupants, while others are arranged to accommodate six. Three-occupancy rooms have a convertible sofa with three comfortable, independently adjustable seats, each provided with an arm rest, which may be folded away into the seat portion when not in use. The six-occupancy rooms have two convertible sofas apiece, each provided with three seats.

Provisions are made to afford the room occupants all possible comforts, both in the daytime and at night. The adjustable seats may be inclined so that the occupant may lounge in the daytime, and a retractable foot rest is conveniently situated for each occupant.

Each room has sleeping accommodations for all occupants of that room, and they constitute berths arranged in tiers of three. During the daytime, these berths are entirely out of the way, so as to provide the maximum amount of room to the daytime user, and at night they are converted into comfortable beds completely enclosed to provide the maximum degree of privacy.

Suitable accommodations are provided in which the clothing of the occupants may be hung, both during the daytime and at night.

Very compact wash basin facilities form part of the equipment in each room, and they may be made inaccessible to the room occupants and can be locked. This is desirable, because in the daytime when the seats are occupied it would be very unpleasant, particularly to the occupants closest to the windows, if the wash basin were in use. These basins are primarily intended for use at night and in the morning, so that the occupants may prepare for bed and make their toilet on arising without leaving their room. Toilet facilities at the ends of the cars are always available for the occupants' use.

Curtains separate each room from the aisle, so that at night, after everyone has retired, the porter may open the aisle curtains and have access into the rooms. In this respect, the arrangement is made similar to the open-section sleeping car, with each occupant enclosed in his berth by a berth curtain.

When the room is made up for night use, a ladder providing the maximum degree of safety always is in position to afford access to the intermediate and upper berths. Although this ladder obstructs the floor area in the room, it may easily be swung out of the way of anyone desiring to use the floor space. The ladder is conveniently stored in its corresponding room during the daytime.

When the porter is making up the rooms for day or night use, hinged seats situated in the car aisle provide temporary accommodations for the room occupants. These seats normally are held against the car side wall entirely out of the way. The room facilities require a minimum of time to change from day to night use, or vice versa.

The car is fully air conditioned, and, during the nighttime, a plentiful supply of conditioned air is available to the occupant of each berth, and he may control the ventilation of his berth to suit his own requirements.

The key for locking and unlocking the wash basin is generally held by the porter in charge of the car, so that when the basin is locked in its closed position during the daytime, it cannot be opened and used by room occupants unless the porter approves of such use.

We claim:

1. In a railway car, an aisle extending lengthwise to the car adjacent to one of the car sides, a room adjacent to the other side of the car, partitions extending crosswise to the car from the car side wall on the room side and ending at the aisle, said partitions extending from the floor to the ceiling and together with the last mentioned car side wall serving as room walls, the room on the aisle side being open, a sofa in the room extending crosswise to the car with its back against one of the partitions, said last named partition above the top of the sofa back being open over a substantial portion of its area, a berth unit adjacent to the last named wall comprising a berth pan horizontally hinged above the opening and adapted to pivot from a vertical position over the opening to a horizontal position above the opening, and a bunk supported by said pan.

2. In a railway car, an aisle extending lengthwise to the car adjacent to one of the car sides, a room adjacent to the other side of the car, partitions extending crosswise to the car from the car side wall on the room side and ending at the aisle, the partitions extending from the floor to the ceiling and together with the last mentioned car side wall serving as room walls, seats in the room, the crosswise partitions being open above substantially a horizontal line midway between the floor and the ceiling, removable means for closing the openings in the partitions including a panel member hinged to the partition above the opening adapted to pivot downwardly to a position over the opening, and a foldable bunk supported on said panel.

3. In a railway car, a room, a partition extending transversely of the car and forming one of the room walls, the partition being open over a substantial portion of its width in the region substantially midway between the floor and the room ceiling, a berth unit adjacent to said partition and pivotally mounted above the partition opening and adapted to swing downwardly about the pivot, and including panel means extending over at least a portion of the opening only when the berth is swung downwardly.

4. In a railway car, an aisle extending lengthwise to the car adjacent to one of the car sides, a room adjacent to the other car side, partitions extending crosswise to the car from the car side wall on the room side and ending at the aisle, the partitions extending from the floor to the ceiling and together with the last mentioned car side wall serving as room walls, the room on the aisle side being open, a sofa in the room extending crosswise to the car with its back against one of the crosswise partitions, the crosswise partition above the top of the sofa back being open over a substantial portion of its area, an upper berth in the upper region of the room disposed above the sofa, an intermediate berth closed in its inoperative position against the underneath face of the upper berth and being adapted to assume a position substantially midway between the upper berth and the sofa seat when it is in its open position and partially closing the opening in the partition when in its open position, and means cooperating with the open intermediate berth for completing the closing of said opening.

5. In a room, a room wall having an opening therein, a panel substantially coextensive with the length of the opening hinged to the wall about a horizontal axis directly below the opening and adapted to be pivoted upwardly into the plane of the wall to close a portion of the opening, a bunk mounted adjacent to said wall above the opening and including a pan, a bunk in the pan pivoted thereto about an axis extending lengthwise to the bunk, and horizontal pivot means for mounting the pan in hinged relationship with respect to the wall about an axis extending lengthwise to the bunk so that the pan may be rotated downwardly about the pivotal axis to assume substantially a vertical position against the wall, the pan and the hinged panel cooperating to close the opening in the wall, the bunk being adapted to be pivoted out of the pan to a horizontal position substantially at right angles to the pan when the latter is in its lowered position.

6. In a room, a room wall having an opening therethrough over a large part of its area, a panel hinged to the wall adjacent to the opening and being adapted to cover a portion of the opening, a bunk adjacent to said wall which when not in use is supported in a substantially horizontal position in the upper region of the room above the wall opening, said bunk comprising a pan pivoted about an axis parallel with and adjacent to said wall, a bunk foldable into the pan and pivoted about an axis substantially parallel to said wall, the second named axis being adjacent to the edge of the pan farthest removed from the wall, the pan being adapted to swing downwardly about its pivotal axis to a substantially vertical position against the wall and to cover a portion of the opening in said wall, the hinged panel and the pan cooperating to close said wall opening, means for locking the pan in its open position against the wall, the bunk being adapted to be pivoted out of the pan when the latter is in its open vertical position, and means for supporting the outer edge of the bunk when it is in its open position.

7. In a room, a sofa placed with its back against one of the room walls, the wall above the sofa being substantially entirely open, a bunk in the upper region of the room above the sofa with one edge adjacent to the said wall, an intermediate bunk between the sofa and the upper bunk and comprising a pan pivoted about an axis extending lengthwise to the bunk, so that the pan may be pivoted from a horizontal position to a vertical position, retractable means for holding the pan in a substantially horizontal position closely adjacent to the underneath face of the upper bunk, the pan and its pivot being so arranged with respect to the wall opening that when the pan is pivoted to its lowered vertical position it substantially closes the opening, a bunk in the pan pivoted thereto so that the bunk may be pivoted out of the pan to a position substantially at right angles to the pan, means for locking the pan in its lowered position against the wall opening, and means for supporting the intermediate bunk in its open position at right angles to the pan when the latter is in its lowered position.

8. In a room, a room wall having an opening therethrough over a large part of its area, a panel hinged to the wall adjacent to the lower edge of the opening and adapted to pivot to a position covering the lower portion of the opening, a sofa-bed in the room having a seat portion and a back parallel to and disposed against the said panel when the latter is open, the back of the sofa-bed being pivotally mounted so as to be movable in a horizontal position over the seat portion of the sofa, the hinged panel being movable to its closed position over the opening only when the seat back is moved away from the wall toward its horizontal position, a bunk adjacent to said wall which when not in use is supported in a substantially horizontal position in the upper region of the room above the wall opening, said bunk comprising a pan pivoted about an axis parallel with and adjacent to said wall, a bunk foldable into the pan and pivoted about an axis substantially parallel to said wall, the second named axis being adjacent to the edge of the pan farthest removed from the wall, the pan being adapted to swing downwardly about its pivotal axis to a substantially vertical position against the wall and to cover a portion of the opening in said wall, the hinged panel and the pan cooperating to close said wall opening, means for locking the pan in its open position against the wall, the bunk being adapted to be pivoted out of the pan when the latter is in its open vertical position, and means for supporting the outer edge of the bunk when in its open position.

9. In a room, a wall therein having a portion providing visibility therethrough to the room exterior, a berth unit in the room disposed with one edge adjacent to said wall and comprising a pan pivoted adjacent to said wall about a horizontal axis disposed above the said wall portion so that the pan may be pivoted from a horizontal position above the said wall portion to a vertical position at least partially covering said portion, a bunk in the pan pivoted thereto so that the bunk may be moved out of the pan to an operative position substantially at right angles to the pan when the latter is in its vertical position, means for locking the pan in its vertical position over said wall portion, and means for supporting the bunk in its operative position.

10. In a room, a wall therein having a portion providing visibility therethrough to the room exterior, a berth unit in the room disposed with one edge adjacent to said wall, the berth being movable from an elevated, inoperative position above the said wall portion to a lower, operative position adjacent to the said wall portion, and means connected to said berth simultaneously closing at least a part of said wall portion when the berth is lowered, the said closing means being adapted to close at least part of said wall portion only when the berth is lowered.

PETER PARKE.
JAMES K. TULLY.
LEIF ANDERSEN.
BASIL E. JONES.